(12) United States Patent
Chu et al.

(10) Patent No.: US 11,792,829 B2
(45) Date of Patent: Oct. 17, 2023

(54) METHOD AND APPARATUS FOR MULTI-LINK OPERATIONS

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 68 days.

(21) Appl. No.: 17/183,206

(22) Filed: Feb. 23, 2021

(65) Prior Publication Data

US 2021/0266891 A1    Aug. 26, 2021

Related U.S. Application Data

(60) Provisional application No. 63/023,566, filed on May 12, 2020, provisional application No. 63/015,613, filed on Apr. 26, 2020, provisional application No. 62/980,965, filed on Feb. 24, 2020, provisional application No. 62/980,347, filed on Feb. 23, 2020.

(51) Int. Cl.
*H04W 72/51* (2023.01)
*H04W 72/23* (2023.01)
*H04L 5/14* (2006.01)
*H04W 52/02* (2009.01)

(52) U.S. Cl.
CPC .............. *H04W 72/51* (2023.01); *H04L 5/14* (2013.01); *H04W 52/0216* (2013.01); *H04W 72/23* (2023.01)

(58) Field of Classification Search
CPC ........... H04W 72/048; H04W 72/1289; H04W 52/0216; H04L 5/14
See application file for complete search history.

(56) References Cited

U.S. PATENT DOCUMENTS

| 2019/0239226 A1* | 8/2019 | Chu ...................... H04L 5/0037 |
| 2021/0014811 A1* | 1/2021 | Seok ..................... H04W 76/15 |
| 2021/0014911 A1* | 1/2021 | Patil .................. H04W 72/0446 |

(Continued)

FOREIGN PATENT DOCUMENTS

CN          113099486 A    *  7/2021

OTHER PUBLICATIONS

Chu, Liwen et al.; "Multiple Link Operation Follow Up—Doc.: IEEE 802.11-20/0487r5"; 15 pages (Mar. 1, 2020).

(Continued)

*Primary Examiner* — Jianye Wu

(57) ABSTRACT

Embodiments of a method and an apparatus for multi-link operations are disclosed. In an embodiment, a method of multi-link operations involves, at a multi-link station device that has a non-simultaneous transmission and reception capability (NSTR STA MLD) that supports multiple links, exchanging frames on multiple links with a multi-link access point device (AP MLD) that has at least one of a simultaneous transmission capability and a simultaneous transmission and reception (STR) capability, and maintaining, at the NSTR STA MLD, at least one of a frame exchange and a link state on multiple links with the AP MLD that has at least one of the simultaneous transmission capability and the STR capability.

20 Claims, 15 Drawing Sheets

(56) References Cited

U.S. PATENT DOCUMENTS

2021/0029741 A1* 1/2021 Ghosh ............... H04W 74/0816
2021/0067285 A1* 3/2021 Cariou ............... H04L 27/2601
2021/0127420 A1* 4/2021 Lu ..................... H04W 74/0808

OTHER PUBLICATIONS

Ho, Duncan et al.; "MLA: Non-STR STA Behaviors—doc.: IEEE 802.11-20/0444r1"; 7 pages (Mar. 14, 2020).
Park, Minyoung et al.; "Enhanced Multi-Link Single Radio Operation—doc.: 802.11-20/0562r0"; 12 pages (Apr. 21, 2020).

* cited by examiner ental Patent Application Ser. No. 63/023,566, filed on May 12, 2020, each of which is incorporated by reference herein.

METHOD AND APPARATUS FOR MULTI-LINK OPERATIONS

CROSS-REFERENCE TO RELATED APPLICATIONS

This application is entitled to the benefit of U.S. Provisional Patent Application Ser. No. 62/980,347, filed on Feb. 23, 2020, and U.S. Provisional Patent Application Ser. No. 62/980,965, filed on Feb. 24, 2020, and U.S. Provisional Patent Application Ser. No. 63/015,613, filed on Apr. 26, 2020, and U.S. Provisional Patent Application Ser. No. 63/023,566, filed on May 12, 2020, each of which is incorporated by reference herein.

BACKGROUND

In multi-link operations, wireless devices, e.g., access point (AP) multi-link devices (MLDs) or non-AP MLDs, e.g., STA multi-link devices (STA MLDs), can execute various multi-link operations, such as transmission and reception of frames via one or more communication links. As an example, a wireless AP MLD may simultaneously transmit and receive Physical Layer Protocol Data Units (PPDUs) with a wireless STA MLD on multiple links to exchange information of multiple links and maintain link activity. In such multi-link operations, there may be instances when at least one of the wireless devices may not support simultaneous transmission and reception (STR) of frames on multiple links, where various techniques may be found to avoid STR in a non-STR wireless devices and improve throughput.

SUMMARY

Embodiments of a method and an apparatus for multi-link operations are disclosed. In an embodiment, a method of multi-link operations involves, at a multi-link station device that has a non-simultaneous transmission and reception capability (NSTR STA MLD) that supports multiple links, exchanging frames on multiple links with a multi-link access point device (AP MLD) that has at least one of a simultaneous transmission capability and a simultaneous transmission and reception (STR) capability, and maintaining, at the NSTR STA MLD, at least one of a frame exchange and a link state on multiple links with the AP MLD that has at least one of the simultaneous transmission capability and the STR capability.

In an embodiment, maintaining the frame exchange at the NSTR STA MLD further involves avoiding, at the NSTR STA MLD, simultaneous transmit while receive on multiple links with the AP MLD that has at least one of the simultaneous transmission capability and the STR capability.

In an embodiment, avoiding simultaneous transmit while receive at the NSTR STA MLD further involves, at an interframe space on each link, timing the interframe space to be longer than a Short Interframe Space (SIFS) and shorter than a Point Coordination Function (PCF) Interframe Space (PIFS).

In an embodiment, avoiding simultaneous transmit while receive at the NSTR STA MLD further involves indicating, by the NSTR STA MLD, parameters for a responding frame in a High Efficiency (HE) Control field of a Physical Layer Protocol Data Unit (PPDU), and transmitting the PPDU to the AP MLD that has at least one of the simultaneous transmission capability and the STR capability.

In an embodiment, the parameters for the responding frame includes at least one of a PPDU length, a PPDU type, a Modulation and Coding Scheme (MCS), and bandwidth information.

In an embodiment, the HE Control field is at least one of a new defined field and a triggered response scheduling (TRS) field.

In an embodiment, the PPDU is at least one of a Trigger frame and a frame with a new control subtype.

In an embodiment, maintaining the link state at the NSTR STA MLD further involves, at the NSTR STA MLD, finishing a transmission on a second link, link2, while a backoff counter of a first link, link1, is not zero, deferring link1's backoff until at least one of a PPDU with Transmission Opportunity (TXOP) duration information is received on link2 and a time of NAVSyncDelay passes without detection of the PPDU, and resuming the link state of link1 at the NSTR STA MLD.

In an embodiment, maintaining the link state at the NSTR STA MLD further involves, at the NSTR STA MLD, finishing the transmission on link2, receiving, at the NSTR STA MLD, from the AP MLD that has at least one of the simultaneous transmission capability and the STR capability, an announcement that indicates activity on link1 during the transmission on link2, wherein the announcement reports the AP MLD's network allocation vector (NAV) timer of link1, advancing the backoff counter of link1 in response to the announcement received at the NSTR STA MLD, and resuming the link state of link1 at the NSTR STA MLD.

In an embodiment, resuming the link state of link1 at the NSTR STA MLD further involves synchronization of a medium via performing the backoff based on an energy level and a Clear Channel Assessment (CCA) level before a NAVSyncDelay for transmitting a Request-to-Send (RTS) frame, and wherein the energy level and CCA level are between −82 dbm and −62 dbm.

An embodiment of a NSTR STA MLD is also disclosed. The NSTR STA MLD includes a processor configured to support multiple links, exchange frames on multiple links with an AP MLD with at least one of a simultaneous transmission capability and a STR capability on the multiple links, and maintain at least one of a frame exchange and a link state on multiple links with the AP MLD that has at least one of the simultaneous transmission capability and the STR capability.

In an embodiment, maintenance of the frame exchange on the multiple links further involves avoidance of simultaneous transmit while receive on multiple links with the AP MLD that has at least one of the simultaneous transmission capability and the STR capability.

In an embodiment, avoidance of simultaneous transmit while receive at the NSTR STA MLD further involves, at an interframe space on the multiple links, time of the interframe space being longer than a SIFS and shorter than a PIFS.

In an embodiment, avoidance of simultaneous transmit while receive at the NSTR STA MLD further involves indication of parameters for a responding frame in a HE Control field of a PPDU, and transmission of the PPDU to the AP MLD that has at least one of the simultaneous transmission capability and the STR capability.

In an embodiment, the parameters for the responding frame includes at least one of a PPDU length, a PPDU type, a MCS, and bandwidth information.

In an embodiment, the HE Control field is at least one of a new defined field and a TRS field.

In an embodiment, the PPDU is at least one of a Trigger frame and a frame with a new control subtype.

In an embodiment, maintenance of the link state further involves completion of a transmission on a second link, link2, while a backoff counter of a first link, link1, is not zero, deferment of link1's backoff until at least one of a PPDU with TXOP duration information is received on link2 and a time of NAVSyncDelay passes without detection of the PPDU, and resumption of the link state of link1 at the NSTR STA MLD.

In an embodiment, wherein maintenance of the link state further involves completion of the transmission on link2, reception of an announcement that indicates activity on link1 during the transmission on link2 from the AP MLD that has at least one of the simultaneous transmission capability and the STR capability, advancement of the backoff counter of link1 in response to the announcement from the AP MLD that has at least one of the simultaneous transmission capability and the STR capability, wherein the announcement reports the AP MLD's NAV timer of link1, and resumption of the link state of link1 at the NSTR STA MLD.

In an embodiment, resumption of the link state of link1 at the NSTR STA MLD further involves synchronization of a medium via performance of the backoff based on an energy level and a CCA level before a NAVSyncDelay for transmission of a RTS frame, and wherein the energy level and CCA level are between −82 dbm and −62 dbm.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
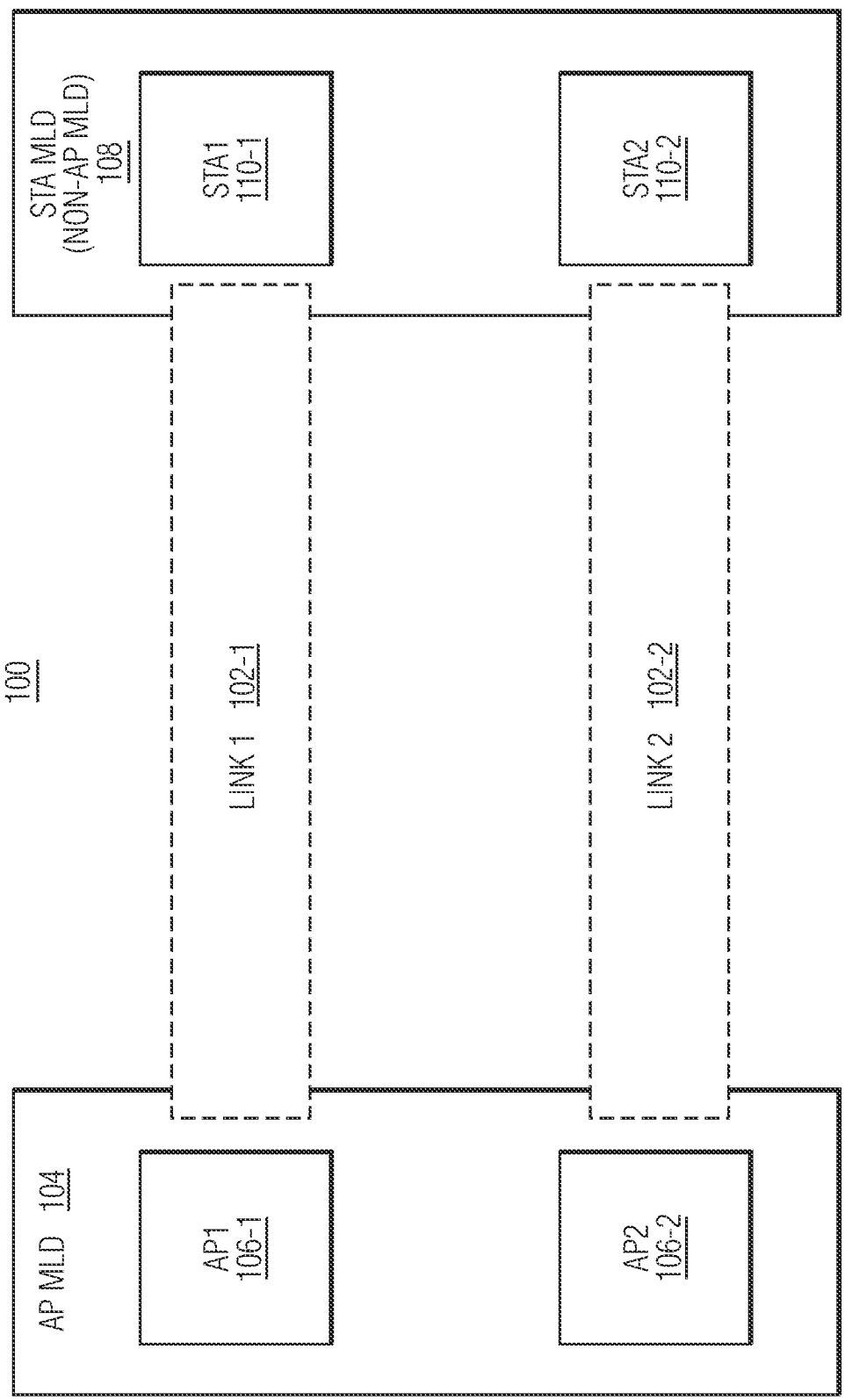
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., an access point (AP) multi-link device (MLD) of a wireless local area network (WLAN) transmits/receives data to/from at least one associated station (STA) MLD. The AP MLD is configured to operate with associated STA MLDs according to a communication protocol. For example, the communication protocol may be an Extremely High Throughput (EHT) communication protocol, or Institute of Electrical and Electronics Engineers (IEEE) 802.11be communication protocol. The EHT communication protocol (i.e., IEEE 802.11be standard) is a next generation of the communications protocol that will succeed an IEEE High Efficiency (HE) 802.11ax standard. Additional future versions (e.g., next-generation communication protocols) of the IEEE 802.11 communication protocol may succeed IEEE 802.11ax or IEEE 802.11be. Features of wireless communications and multi-link communication systems operating in accordance with the EHT communication protocol and/or next-generation communication protocols may be referred to herein as "non-legacy" features. In some embodiments of the wireless communications system described herein, different associated STAs of STA MLDs within range of an AP of an AP MLD operating according to the EHT communication protocol are configured to operate according to at least one other communication protocol, which defines operation on one link with the AP, but are generally affiliated with lower data throughput communication protocols. The lower data throughput communication protocols (e.g., IEEE 802.11n, IEEE 802.11ac, IEEE 802.11ax, etc.) may be collectively referred to herein as "legacy" communication protocols. It is desirable that future versions of the communication protocol provide backward compatibility and support interoperability with legacy versions of the IEEE 802.11 communication protocol.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes one AP MLD with multiple STA MLDs, or multiple AP MLDs with more than one STA MLD. In another example, although the multi-link communications system is shown in FIG. 1 as being connected in a certain topology, the network topology of the multi-link communications system is not limited to the topology shown in FIG. 1. Furthermore, the techniques described herein may also be applicable to each link of a multi-link communications system.

In the embodiment depicted in FIG. 1, the AP MLD 104 includes two radios and two links, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., beacon acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP MLD connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different size channel. For example, AP1 106-1 may operate in a 320 MHz channel and AP2 106-2 may operate in a 160 MHz channel. In some embodiments, an AP MLD may have more than two radios and more than two links.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements common MAC functionalities and the non-AP STAs 110-1 and 110-2 implement lower layer MAC functionalities (e.g., medium access, transmit/receive frames, Aggregated MAC Protocol Data Unit (A-MPDU) operation, power save, etc.). In some embodiments, the AP MLD 104 and/or the STA MLD 108 identifies which communication links support the multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, STA1 110-1 of STA MLD 108 may operate in different subchannels of an AP's (e.g., AP1 106-1) Basic Service Set (BSS) operating channel. In some embodiments, STA2 110-2 of STA MLD 108 may operate in different subchannels of another AP's (e.g., AP2 106-2) BSS operating channel. For example, STA1 110-1 may operate in a first subchannel of a first BSS operating channel and STA2 110-2 may operate in a first subchannel of a second BSS operating channel. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver. In some embodiments, a STA MLD may have more than two radios and more than two communication links.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with the APs 106-1 or 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), data frames, beacons, management frames, etc.) between a first wireless device (e.g., an AP) and a second wireless device (e.g., a STA). In some embodiments, multiple 20 MHz channels may be aggregated to form a channel segment (e.g., a 40 MHz channel). Although the STA MLD 108 is shown in FIG. 1 as including two non-AP STAs, other embodiments of the STA MLD 108 may include more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via more than two communication links.

In some embodiments, there may be different levels of multi-link operation capabilities between two links of an MLD when the MLD communicates via two links. In some embodiments, an MLD may have a level 1 capability between a pair of links which involves the MLD having a simultaneous transmission and reception (STR) capability, such that the MLD may transmit and receive data on the pair links (e.g., link1 and link2) simultaneously whose start times can be different. In some embodiments, the MLD may have a level 2 capability between a pair of links which involves the MLD having a simultaneous transmission capability, such that the MLD may transmit data on the pair of two links (e.g., link1 and link2) whose start times can be different. In some embodiments, the MLD may have a level 3 capability which involves the MLD having a non-simultaneous transmission and reception (NSTR) capability between a pair of links, such that the MLD may receive data on different links (e.g., link1 and link2) whose start times can be different. In such an embodiment, the MLD with the level 1 capability may perform level 2 capability operations and level 3 capability operations. In such an embodiment, the MLD with the level 2 capability may not be able to perform level 1 capability operations, but may perform level 3 capability operations. In such an embodiment, the MLD with the level 3 capability may not be able to perform level 1 capability operations or level 2 capability operations.

In some embodiments, the MLD with STR capability may be a STA MLD or an AP MLD which may perform a separate backoff in each link (e.g., link1 and link2), in which each link has a primary channel. As an example, the primary channel (e.g., a primary 20 MHz channel) of each link may be used to perform backoff and detect frames (e.g., data frames, control frames, management frames, etc.). In some embodiments, the MLD with simultaneous transmission capability may be a STA MLD or an AP MLD which may also perform a separate backoff in each link (e.g., link1 and link2), in which each link has a primary channel (e.g., primary 20 MHz channel). In such an embodiment, the MLD with simultaneous transmission capability may require that transmission on each link end at the same time. In some embodiments, the MLD with the NSTR capability may be a multi-link station device that has a non-simultaneous transmission and reception capability (NSTR STA MLD) which may also perform a separate backoff in each link (e.g., link1 and link2), in which each link has a primary channel (e.g., primary 20 MHz channel). In such an embodiment, the MLD with the NSTR capability may transmit PPDUs on multiple links with the same start time where the transmission on the link (e.g., link1) whose backoff counter becomes zero early may be deferred.

In some embodiments, the NSTR STA MLD may request an AP MLD that has simultaneous transmission capability or STR capability (e.g., an STR AP MLD) to trigger the STA MLD to transmit up-link (UL) PPDUs on multiple links at the same time via a Trigger-based (TB) PPDU (e.g., a Request Trigger Transmit (RTT) frame) transmitted by the NSTR STA MLD on a first link (e.g., link1). As an example, an UL transmission may be defined as the transmission of frames or data from STAs/STA MLDs to APs/AP MLDs and a down-link (DL) transmission may be defined as the transmission of frames or data from APs/AP MLDs to STAs/STA MLDs. In some embodiments, the AP MLD may not want to accept the request on link1 if a second link (e.g., link2) has a larger network allocation vector (NAV) Timer value. In another embodiment, if the NSTR STA MLD requests the AP MLD to trigger the NSTR STA MLD to transmit UL PPDUs on multiple links at the same time via a TB PPDU (e.g., RTT frame) on link2, then link1 and link2 may each have a different Transmission Opportunity (TXOP) owner, which makes TXOP recovery difficult.

An example of a NSTR STA MLD requesting an AP MLD that has simultaneous transmission capability or STR capability to trigger the NSTR STA MLD to transmit UL PPDUs on multiple links at the same time via a TB PPDU transmitted by the NSTR STA MLD on one link is described in further detail below with reference to FIG. 2.

Figure 2:
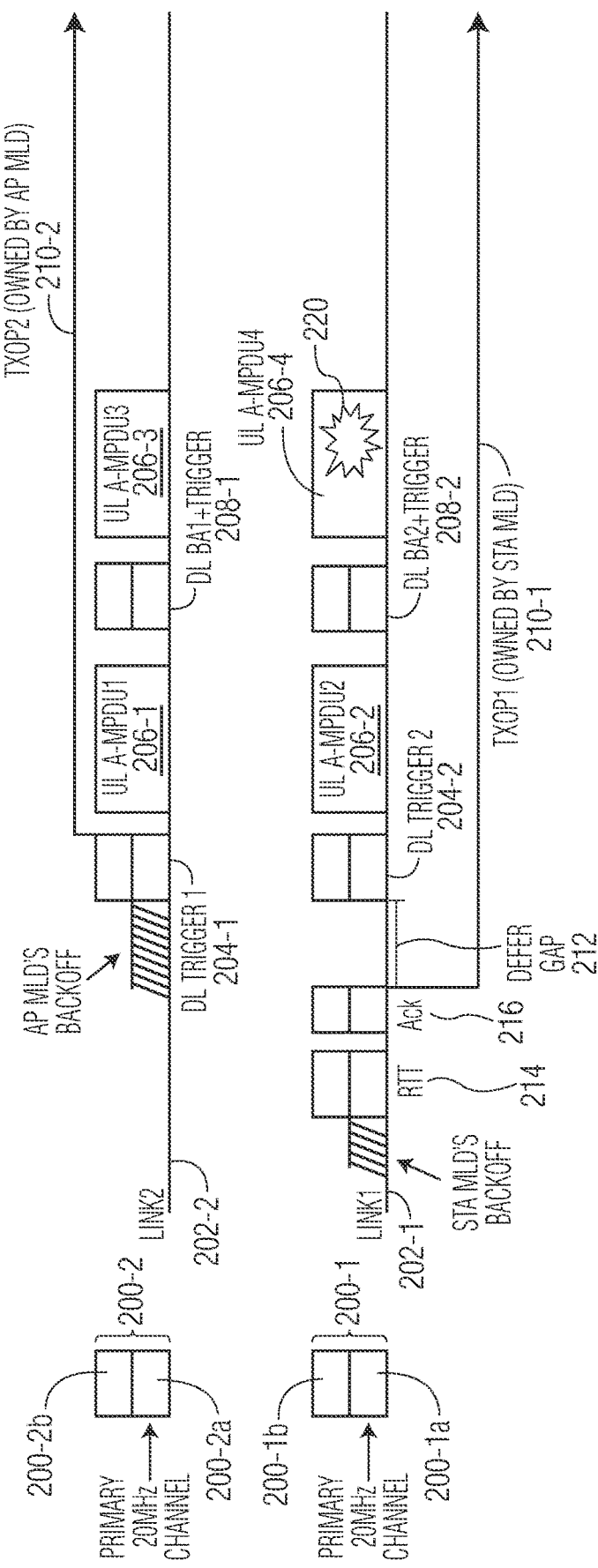
FIG. 2 illustrates an example of a frame exchange between a multi-link station device that has a non-simultaneous transmission and reception capability (NSTR STA MLD) and an access point multi-link device (AP MLD) on multiple links.

FIG. 2 illustrates an example of a frame exchange between a NSTR STA MLD and an STR AP MLD on multiple links. With reference to FIG. 2, the NSTR STA MLD (not shown) and the AP MLD that has simultaneous transmission capability or STR capability (not shown) may use two links, e.g., link1 202-1 and link2 202-2, to exchange frames. In particular, FIG. 2 shows link1 202-1 as using a 40 MHz channel 200-1 which includes a primary 20 MHz channel 200-1*a* and a secondary 20 MHz channel 200-1*b*, and link2 202-2 as using a 40 MHz channel 200-2 which includes a primary 20 MHz channel 200-2a and a secondary 20 MHz channel 200-2b.

In some embodiments, after a backoff by the STA MLD on link1 202-1 (shown by "STA MLD's backoff"), the NSTR STA MLD may transmit a RTT frame 214 on link1 202-1 to the AP MLD, to which the AP MLD may respond by transmitting an Acknowledgement (Ack) frame 216 on link1 202-1 to the NSTR STA MLD. In such an embodiment, after receiving the Ack frame 216 on link1 202-1 at the NSTR STA MLD, a first TXOP, TXOP1 210-1 (owned by the STA MLD), begins on link1 202-1 with a Defer gap 212. In some embodiments, after the Defer gap 212 on link1 202-1 and a backoff by the AP MLD on link2 202-2 (shown by "AP MLD's backoff"), the AP MLD may transmit a DL Trigger frame on link1 (e.g., DL Trigger2 204-2) and a DL Trigger frame on link2 (e.g., DL Trigger1 204-1) to the NSTR STA MLD, such that after the DL Trigger1 204-1 is transmitted on link2 202-2, a second TXOP, TXOP2 210-2 (owned by the AP MLD), begins on link2 202-2. As an example, the DL Trigger frames (e.g., DL Trigger1 204-1 and DL Trigger2 204-2) may request the NSTR STA MLD to transmit PPDUs on multiple links at the same time. In some embodiments, after receiving DL Trigger1 204-1 and DL Trigger2 204-2 at the NSTR STA MLD, the NSTR STA MLD may simultaneously transmit a first UL Aggregated MAC Protocol Data Unit (A-MPDU) frame, UL A-MPDU1 206-1, on link2 202-2 and a second UL A-MPDU frame, UL A-MPDU2 206-2, on link1 202-1 to the AP MLD. In such an embodiment, after receiving UL A-MPDU1 206-1 and UL-AMPDU2 206-2 at the AP MLD, the AP MLD may transmit a first DL Block Ack (BA) with Trigger frame, DL BA1+Trigger 208-1, on link2 202-2 and a second DL BA with Trigger frame, DL BA2+Trigger 208-2, on link1 202-1 to the NSTR STA MLD. In some embodiments, after receiving DL BA1+Trigger 208-1 on link2 202-2 and DL BA2+Trigger 208-2 on link1 202-1 at the NSTR STA MLD, the NSTR STA MLD attempts to transmit a third UL A-MPDU, UL A-MPDU3 206-3, on link2 202-2 and a fourth UL A-MPDU, UL A-MPDU4 206-4, on link1 202-1 to the AP MLD. However, in such an embodiment, the transmission and/or the reception of UL A-MPDU4 206-4 may experience an error 220 which causes TXOP recovery to be difficult. Examples of the error 220 may include the NSTR STA MLD improperly transmitting UL A-MPDU4 206-4 or the AP MLD not receiving/detecting UL A-MPDU4 206-4.

With reference to FIG. 2, in some embodiments, the error 220 may cause TXOP recovery to be difficult because each link has a different TXOP owner, e.g., link1 has TXOP1 210-1 owned by the NSTR STA MLD and link2 has TXOP2 210-2 owned by the AP MLD. Consequently, experiencing errors in transmission while exchanging frames between MLDs may cause difficulty in having the same starting time and ending time of PPDUs on two links, and/or an overall inefficiency in wireless device operations. Therefore, to efficiently exchange frames in wireless communications, techniques in accordance with embodiments of the invention are described herein.

In accordance with an embodiment of the invention, a technique for multi-link operations involves, at a NSTR STA MLD that supports multiple links, exchanging frames on multiple links with an AP MLD that has at least one of a simultaneous transmission capability and an STR capability, and maintaining, at the NSTR STA MLD, at least one of a frame exchange and a link state on multiple links with the AP MLD that has at least one of the simultaneous transmission capability and the STR capability. In some embodiments, the technique may involve avoiding simultaneous transmit while receive on one link of the NSTR STA MLD while the NSTR STA MLD is receiving frames on another link, and maintaining the link state by deferring backoff after finishing frame transmissions. By simultaneously using two links and avoiding transmit while receive at an NSTR MLD, the efficiency of multi-link operations can be improved.

Techniques for multi-link operations that involve avoiding simultaneous transmit while receive at a NSTR STA MLD are described in further detail below with reference to FIGS. 3-5.

Figure 3:
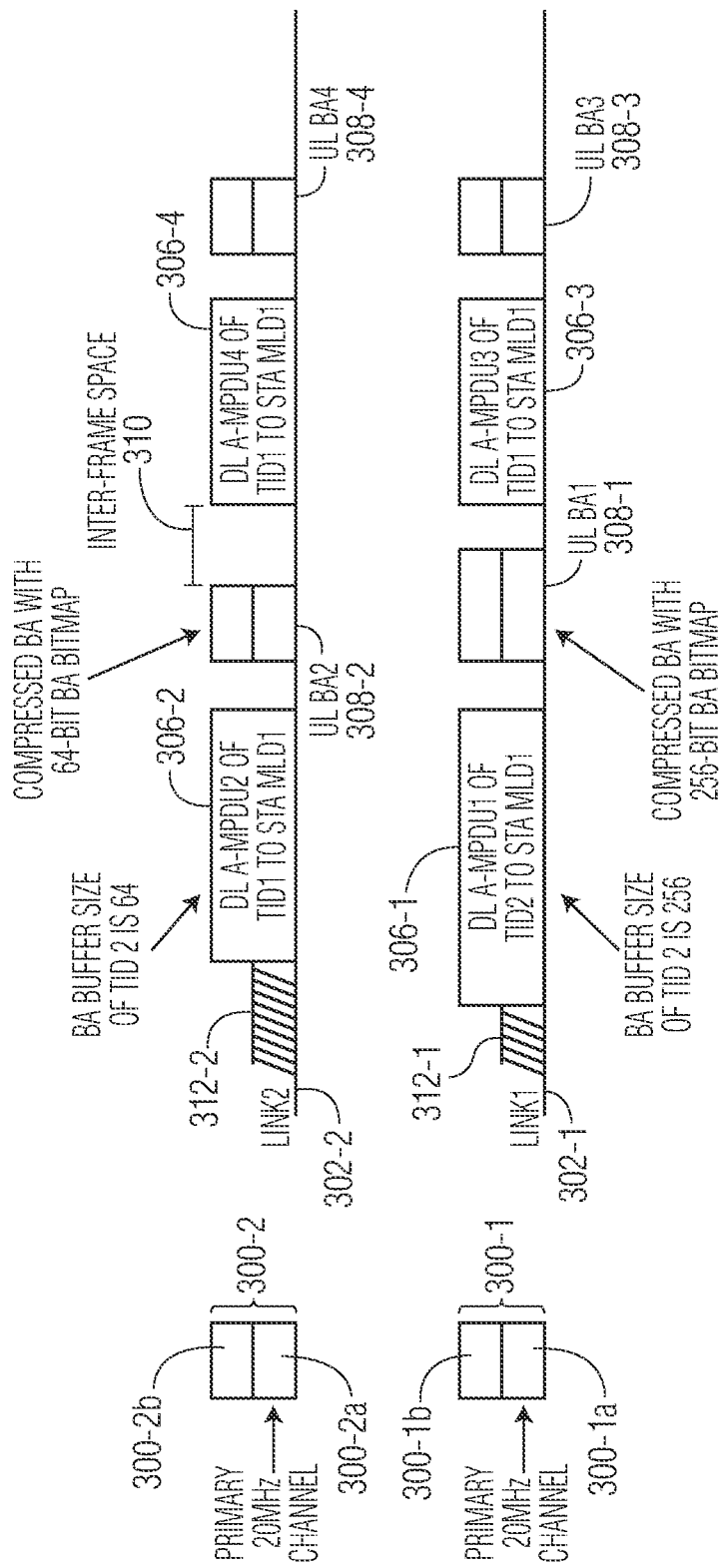
FIG. 3 illustrates an example of a technique that may be used by a NSTR STA MLD to avoid simultaneous transmission and reception (STR) frame exchange in accordance with an embodiment of the invention.

FIG. 3 illustrates an example of a technique that may be used by a NSTR STA MLD to avoid simultaneous transmit while receive in accordance with an embodiment of the invention. With reference to FIG. 3, the NSTR STA MLD (not shown) and an AP MLD that has simultaneous transmission capability or STR capability (not shown) may use two links, e.g., link1 302-1 and link2 302-2, to exchange frames. In particular, FIG. 3 shows link1 302-1 as using a 40 MHz channel 300-1 which includes a primary 20 MHz channel 300-1a and a secondary 20 MHz channel 300-1b, and link2 302-2 as using a 40 MHz channel 300-2 which includes a primary 20 MHz channel 300-2a and a secondary 20 MHz channel 300-2b.

In some embodiments, a first backoff 312-1 on link1 302-1 and a second backoff 312-2 on link2 302-2 may start at a similar time, but the first backoff 312-1 may end before the second backoff 312-2. In some embodiments, after the first backoff 312-1 on link1 302-1, the AP MLD may transmit a first DL A-MPDU frame of a second Traffic Identifier (TID) to the NSTR STA MLD on link1 302-1, e.g., DL A-MPDU1 of TID2 to STA MLD1 306-1, such that a BA buffer size of TID2 is 256. In some embodiments, after the second backoff 312-2 on link2 302-2, the AP MLD may transmit a second DL A-MPDU frame of a first TID to the STA MLD on link2 302-2, e.g., DL A-MPDU2 of TID1 to STA MLD1 306-2, such that the BA buffer size of TID1 is 64. In such an embodiment, DL A-MPDU1 of TID2 to STA MLD1 306-1 and DL A-MPDU2 of TID1 to STA MLD1 306-2 may have an aligned transmission end time. Examples of an aligned transmission time (e.g., aligned transmission start time or aligned transmission end time) include frames starting and/or ending at the same time on at least two links. In some embodiments, after receiving DL A-MPDU1 of TID2 to STA MLD1 306-1 and DL A-MPDU2 of TID1 to STA MLD1 306-2 at the NSTR STA MLD, the NSTR STA MLD may transmit a first UL BA frame, UL BA1 308-1, on link1 302-1 and a second UL BA frame, UL BA2 308-2, on link2 302-2 to the AP MLD, such that UL BA1 308-1 and UL BA2 308-2 have an aligned transmission start time. However, in such an embodiment, UL BA1 308-1 and UL BA2 308-2 have an unaligned transmission end time in which a transmission end time of UL BA2 308-2 is before the transmission end time of UL BA1 308-1. In some embodiments, after receiving UL BA1 308-1 and UL BA2 308-2 at the AP MLD, the AP MLD may transmit a third DL A-MPDU frame of the first TID to the NSTR STA MLD, e.g., DL A-MPDU3 of TID1 to STA MLD1 306-3, on link1 302-1 and transmit a fourth DL A-MPDU frame of the first TID to the STA MLD, e.g., DL A-MPDU4 of TID1 to STA MLD1 306-4, on link2 302-2 after an interframe space 310. In such an embodiment, DL A-MPDU3 of TID1 to STA MLD1 306-3 on link1 302-1 and DL A-MPDU4 of TID1 to STA MLD1 306-4 on link2 302-2 have an aligned transmission start/end time, e.g., the transmission start times are aligned and the transmission end times are aligned. In some embodiments, after receiving DL A-MPDU3 of TID1 to STA MLD1 306-3 on link1 302-1 and DL A-MPDU4 of TID1 to STA MLD1 306-4 on link2 302-2 at the NSTR STA MLD, the NSTR STA MLD may transmit a third UL BA frame, UL BA3 308-3, on link1 302-1 and a fourth UL BA frame, UL BA4 308-4, on link2 302-2 to the AP MLD, such that UL BA3 308-3 and UL BA4 308-4 have an aligned transmission start/end time e.g., the transmission start times are aligned and the transmission end times are aligned, and are received by the AP MLD.

With reference to FIG. 3, in some embodiments, the interframe space 310 may involve timing the interframe space on each link to be longer than a Short Interframe Space (SIFS) and shorter than a Point Coordination Function (PCF) Interframe Space (PIFS). In some embodiments, the interframe space 310 may be required for a TXOP holder (e.g., STA MLD or AP MLD) to start subsequent frame exchanges on multiple links (e.g., link1 302-1 and link2 302-2) at the same time (i.e., aligned transmission start time). In some embodiments, the interframe space 310 may also be used when one link (e.g., link1 302-1) experiences an incorrect frame reception (e.g., error 220, FIG. 2), allowing subsequent frames to be transmitted with an aligned start time. Therefore, by using the technique illustrated in FIG. 3, the NSTR STA MLD may maintain the frame exchange while avoiding simultaneous transmit while receive at the NSTR STA MLD. In some embodiments, timing the interframe space to be longer than SIFS and shorter than PIFS may also be used when both an AP MLD and a STA MLD are NSTR MLDs. In some embodiments, timing the interframe space to be longer than SIFS and shorter than PIFS may also be used when STAs of the NSTR STA MLD are TXOP holders on the pair of links.

Figure 4:
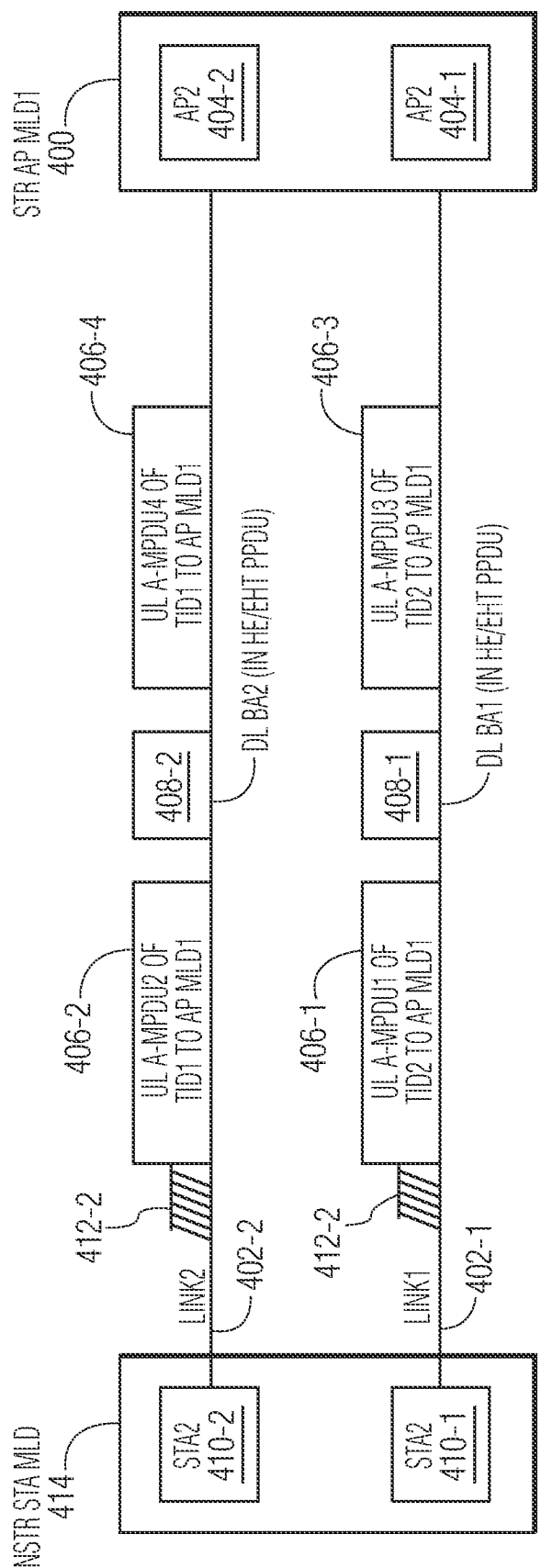
FIG. 4 illustrates another example of a technique that may be used by a NSTR STA MLD to avoid simultaneous transmit while receive in accordance with an embodiment of the invention.

FIG. 4 illustrates another example of a technique that may be used by a NSTR STA MLD to avoid simultaneous transmit while receive in accordance with an embodiment of the invention. With reference to FIG. 4, the NSTR STA MLD 414 includes two STAs, STA1 410-1 and STA2 410-2, which each use a link (e.g., link1 402-1 and link2 402-2), which may use 80 MHz channels to exchange frames with an AP MLD with a STR capability (or a simultaneous transmission capability), e.g., STR AP MLD1 400. In such an embodiment, STR AP MLD 400 includes two APs, AP1 404-1 and AP2 404-2. In some embodiments, STA1 410-1 and AP1 404-1 use link1 402-1 to exchange frames while STA2 410-2 and AP2 404-2 use link2 402-2 to exchange frames.

In some embodiments, a first backoff 412-1 on link1 402-1 and a second backoff 412-2 on link2 402-2 performed by the NSTR STA MLD 414 may start/end at the same time. In such an embodiment, after the first backoff 412-1 on link1 402-1 and the second backoff 412-2 on link2 402-2, the NSTR STA MLD 414 may transmit a first UL A-MPDU frame of a second TID to the STR AP MLD1 400 (e.g., UL A-MPDU1 of TID2 to AP MLD1 406-1) and a second UL A-MPDU frame of a first TID to the STR AP MLD1 400 (e.g., UL A-MPDU2 of TID1 to AP MLD1 406-2). In such an embodiment, UL A-MPDU1 of TID2 to AP MLD1 406-1 and UL A-MPDU2 of TID1 to AP MLD1 406-2 may have an aligned transmission start/end time. In some embodiments, after UL A-MPDU1 of TID2 to AP MLD1 406-1 and UL A-MPDU2 of TID1 to AP MLD1 406-2 are received at the STR AP MLD1 400, the STR AP MLD1 400 may transmit a first DL BA frame (in an HE/EHT PPDU), DL BA1 408-1, on link1 402-1 to the NSTR STA MLD 414, and a second DL BA frame (in an HE/EHT PPDU), DL BA2 408-2, on link2 402-2 to the NSTR STA MLD 414, such that the DL BA frames have an aligned transmission start/end time. In some embodiments, after DL BA1 408-1 and DL BA2 408-2 are received at the NSTR STA MLD 414, the NSTR STA MLD 414 may transmit a third UL A-MPDU frame of the second TID to the STR AP MLD1 400 (e.g., UL A-MPDU3 of TID2 to AP MLD1 406-3) and a fourth UL A-MPDU frame of the first TID to the STR AP MLD1 400 (e.g., UL A-MPDU4 of TID1 to AP MLD1 406-4). In such an embodiment, UL A-MPDU3 of TID2 to AP MLD1 406-3 and UL A-MPDU4 of TID1 to AP MLD1 406-4 may have an aligned transmission start/end time.

With reference to FIG. 4, the STA MLD (e.g., NSTR STA MLD 414) or the AP MLD (e.g., STR AP MLD1 400) may be a TXOP holder. When the AP MLD is the TXOP holder, each AP (e.g., AP1 404-1 and AP2 404-2) affiliated with the AP MLD may be a TXOP holder, and when the STA MLD is the TXOP holder, each STA (e.g., STA1 410-1 and STA2 410-2) affiliated with the STA MLD may be a TXOP holder. In some embodiments, when the TXOP holder is affiliated with the STA MLD (e.g., NSTR STA MLD 414), the STA MLD may indicate parameters for a responding frame (e.g., DL BA1 408-1 or DL BA2 408-2) in an HE Control field of frames carried in a soliciting PPDU (e.g., frames in UL A-MPDU1 of TID2 to AP MLD1 406-1, frames in UL A-MPDU2 of TID1 to AP MLD1 406-2, frames in UL A-MPDU3 of TID2 to AP MLD1 406-3, or frames in UL A-MPDU4 of TID1 to AP MLD1 406-4) and transmit the PPDU to the AP MLD (e.g., STR AP MLD1 400). As an example, parameters for the responding frame may include a PPDU length (e.g., value in a Legacy-Length (L-Length) field of a PHY header), such that the PPDU length may be a number of octets. In some embodiments, parameters for the responding frame include a solicited PPDU type, a Modulation and Coding Scheme (MCS) for the solicited PPDU, and bandwidth information for the solicited PPDU. In such an embodiment, the HE Control field may be a new defined field or a triggered response scheduling (TRS) field. In some embodiments, the parameters may be carried in a Trigger frame. In some embodiments, the indication may be a mandatory requirement or advice. By indicating the same responding PPDU length in each link, simultaneous transmit while receive may be avoided at the NSTR STA MLD. In some embodiments, the technique illustrated in FIG. 4 may be used for STAs of an NSTR STA MLD (that are TXOP holders) to transmit frames to APs of an NSTR AP MLD in multiple links.

Figure 5:
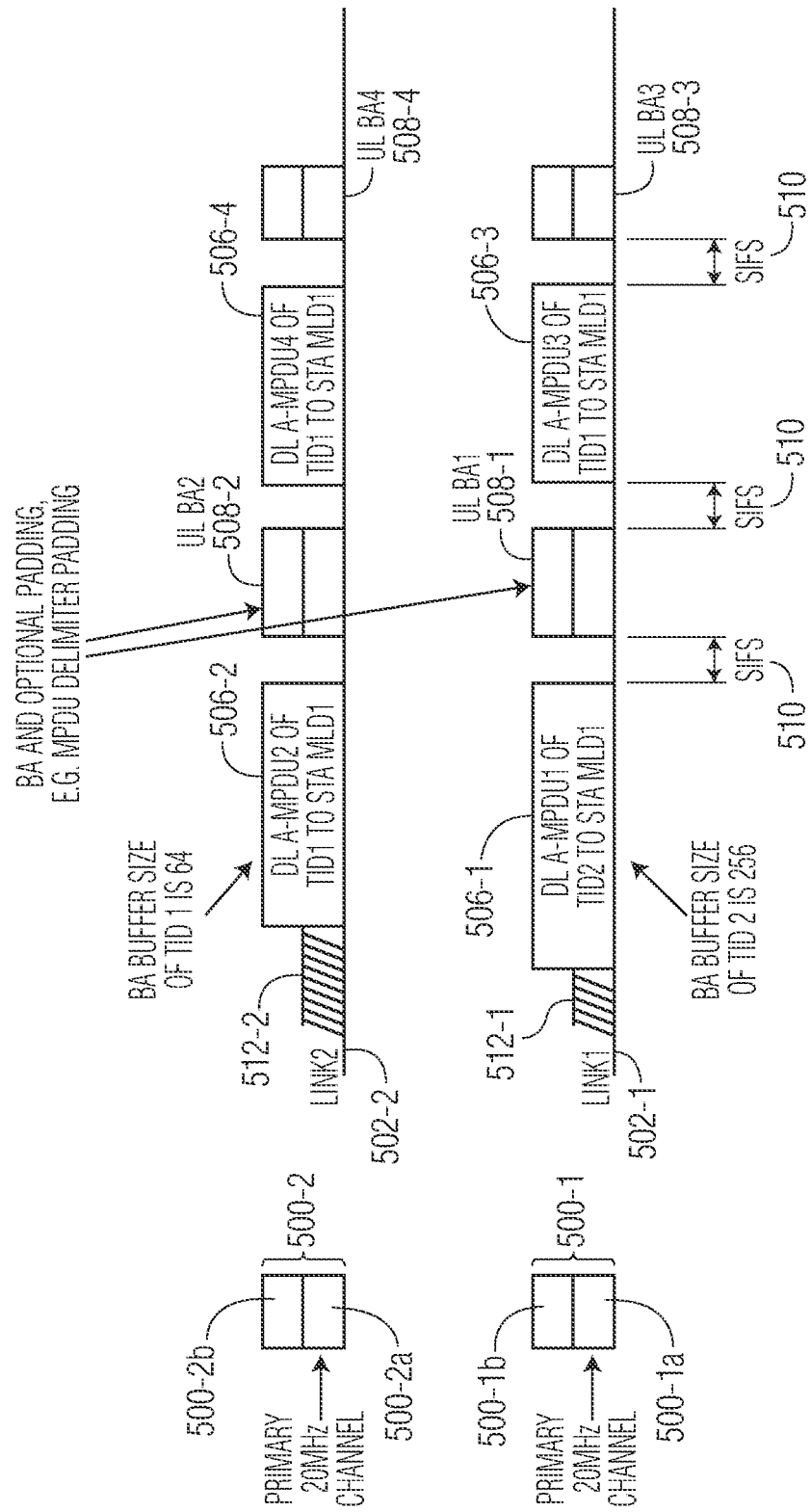
FIG. 5 illustrates another example of a technique that may be used by a NSTR STA MLD to avoid simultaneous transmit while receive in accordance with an embodiment of the invention.

FIG. 5 illustrates another example of a technique that may be used by a NSTR STA MLD to avoid simultaneous transmit while receive in accordance with an embodiment of the invention. With reference to FIG. 5, the NSTR STA MLD (not shown) and an AP MLD that has simultaneous transmission capability or STR capability (not shown) may use two links, e.g., link1 502-1 and link2 502-2, to exchange frames. In particular, FIG. 5 shows link1 502-1 as using a 40 MHz channel 500-1 which includes a primary 20 MHz channel 500-1a and a secondary 20 MHz channel 500-1b, and link2 502-2 as using a 40 MHz channel 500-2 which includes a primary 20 MHz channel 500-2a and a secondary 20 MHz channel 500-2b.

In some embodiments, a first backoff 512-1 on link1 502-1 and a second backoff 512-2 on link2 502-2 may start at a similar time, but the first backoff 512-1 may end before the second backoff 512-2. In some embodiments, after the first backoff 512-1 on link1 502-1, the AP MLD may transmit a first DL A-MPDU frame of a second TID to the NSTR STA MLD on link1 502-1, e.g., DL A-MPDU1 of TID2 to STA MLD1 506-1, such that the BA buffer size of TID2 is 256. In some embodiments, after the second backoff 512-2 on link2 502-2, the AP MLD may transmit a second DL A-MPDU frame of a first TID to the NSTR STA MLD on link2 502-2, e.g., DL A-MPDU2 of TID1 to STA MLD1 506-2, such that the BA buffer size of TID1 is 64. In such an embodiment, DL A-MPDU1 of TID2 to STA MLD1 506-1 and DL A-MPDU2 of TID1 to STA MLD1 506-2 may have an aligned transmission end time. In some embodiments, after receiving DL A-MPDU1 of TID2 to STA MLD1 506-1 and DL A-MPDU2 of TID1 to STA MLD1 506-2 at the NSTR STA MLD, the NSTR STA MLD may transmit a first UL BA frame, UL BA1 508-1, to the AP MLD on link1 502-1 after an interframe space of SIFS 510, and a second UL BA frame, UL BA2 508-2, to the AP MLD on link2 502-2 after the interframe space of SIFS 510, such that UL BA1 508-1 and UL BA2 508-2 have an aligned transmission start/end time. In some embodiments, UL BA1 508-1 and UL BA2 508-2 may each include the BA frame and optional padding (e.g., MPDU delimiter padding). In some embodiments, after receiving UL BA1 508-1 and UL BA2 508-2 at the AP MLD, the AP MLD may transmit a third DL A-MPDU frame of the first TID to the NSTR STA MLD, e.g., DL A-MPDU3 of TID1 to STA MLD1 506-3, on link1 502-1 after the interframe space of SIFS 510, and transmit a fourth DL A-MPDU frame of the first TID to the NSTR STA MLD, e.g., DL A-MPDU4 of TID1 to STA MLD1 506-4, on link2 502-2 after the interframe space of SIFS 510. In such an embodiment, DL A-MPDU3 of TID1 to STA MLD1 506-3 on link1 502-1 and DL A-MPDU4 of TID1 to STA MLD1 506-4 on link2 502-2 have an aligned transmission start/end time. In some embodiments, after receiving DL A-MPDU3 of TID1 to STA MLD1 506-3 on link1 502-1 and DL A-MPDU4 of TID1 to STA MLD1 506-4 on link2 502-2 at the NSTR STA MLD, the NSTR STA MLD may transmit a third UL BA frame, UL BA3 508-3, on link1 502-1 (after the interframe space of SIFS 510) and a fourth UL BA frame, UL BA4 508-4, on link2 502-2 (after the interframe space of SIFS 510) to the AP MLD, such that UL BA3 508-3 and UL BA4 508-4 have an aligned transmission start/end time and are received by the AP MLD.

With reference to FIG. 5, when a PPDU other than a non-High Throughput (non-HT) PPDU is used to carry a responding frame (e.g., UL BA1 508-1, UL BA2 508-2, UL BA3 508-3, or UL BA4 508-4), an MPDU delimiter may be used as padding to fill the responding frame, allowing responding frames to have an aligned transmission end time on multiple links and subsequent PPDUs to have an aligned transmission start time on multiple links. In such an embodiment, a Quality of Service (QoS) Null frame may be aggregated with the responding frame (e.g., Ack/BA) if the responding frame allows such aggregation. By transmitting frames on multiple links with aligned transmission start/end times, the NSTR STA MLD avoids simultaneous transmit while receive.

In some embodiments, the responding frame may be padded before a Frame Check Sequence (FCS). Padding the responding frame before the FCS may involve one of four techniques described herein. According to a first padding technique, padding the responding frame before the FCS may involve specific Per-Association Identifier (AID) TID Information fields in a multi-STA BA frame, such that an AID12 field has a specific value. According to a second padding technique, padding the responding frame before the FCS may involve additional bits in a single TID BA bitmap, such that the BA bitmap may be longer than the longest BA bitmap length as per a negotiated BA buffer size. According to a third padding technique, padding the responding frame before the FCS may involve a specific Per-TID Information field, a BA Starting Sequence Control field, and the BA bitmap, such that the specific Per-TID information field has a specific TID value. According to a fourth padding technique, padding the responding frame before the FCS may involve a variable-length padding field after an effective BA bitmap field of the multi-STA BA frame, a compressed single-TID BA frame, or a multi-TID BA frame.

In some embodiments, when the NSTR STA MLD transmits PPDUs to the AP MLD on one link (e.g., link2) while a backoff counter of another link (e.g., link1) is not zero, the NSTR STA MLD may experience a "deaf link" issue in another link. As an example, when the NSTR STA MLD experiences the deaf link issue, the NSTR STA MLD may lose a link state on link1 after transmitting a first PPDU on link2 because the NSTR STA MLD may be unable to detect whether a medium on link1 (e.g., link1's link state) busy or idle during a PPDU transmission on link2.

An example of a NSTR STA MLD that experiences a deaf link issue during a frame exchange with an AP MLD that has NSTR capability, simultaneous transmission capability, or STR capability is described in further detail below with reference to FIG. 6.

Figure 6:
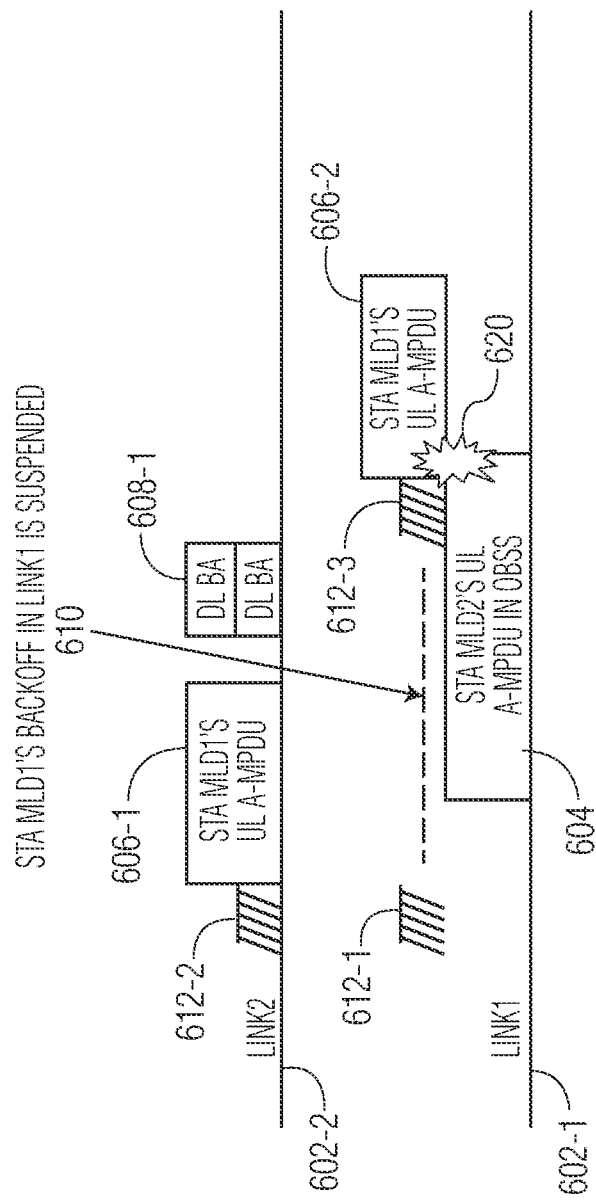
FIG. 6 illustrates another example of a frame exchange between a NSTR STA MLD and an AP MLD on multiple links.

FIG. 6 illustrates another example of a frame exchange between a NSTR STA MLD and an AP MLD on multiple links. With reference to FIG. 6, a first STA MLD (STA MLD1) (not shown) with the NSTR capability and a second STA MLD (STA MLD2) (not shown) may use two links, e.g., link1 602-1 and link2 602-2, which may use 80 MHz channels to exchange frames with different AP MLDs that have simultaneous transmission capability or STR capability (not shown). In particular, FIG. 6 shows a first backoff 612-1 on link1 602-1 and a second backoff 612-2 on link2 602-2, which start/end at a similar time, performed by STA MLD1 before exchanging frames with an associated AP MLD.

In some embodiments, after the first backoff 612-1 on link1 602-1 and the second backoff 612-2 on link2 602-2, STA MLD1 may transmit a first UL A-MPDU frame to the AP MLD (e.g., STA MLD1's UL A-MPDU 606-1) on link2 602-2 and suspend STA MLD1's backoff on link1 602-1 (shown by dashed line 610). During the transmission of STA MLD1's UL A-MPDU 606-1 on link2 602-2 and STA MLD1's suspended backoff 612-1 on link1 602-1, STA MLD2 (in a neighbor multi-link BSS) may transmit an UL A-MPDU frame to the associated AP MLD (e.g., STA MLD2's UL A-MPDU in Overlapping Basic Service Set (OBSS) 604) on link1 602-1. In some embodiments, after receiving STA MLD1's UL A-MPDU 606-1 on link2 602-2 at the AP MLD, the AP MLD may transmit a DL BA frame, DL BA 608-1, on link2 602-2 to STA MLD1 during the transmission of STA MLD2's UL A-MPDU in OBSS 604 on link1 602-1. In such an embodiment, because STA MLD1 has the NSTR capability, STA MLD1 is unaware of STA MLD2's UL A-MPDU in OBSS 604 on link1 602-1. Therefore, STA MLD1 may perform a third backoff 612-3 on link1 602-1 and attempt to transmit a second UL A-MPDU frame to the AP MLD (e.g., STA MLD1's UL A-MPDU 606-2) on link1 602-1 during the transmission of STA MLD2's UL A-MPDU in OBSS 604 on link1 602-1. In such an embodiment, STA MLD1's transmission may then experience an error 620, causing STA MLD2's frame exchange to fail.

In some embodiments, to resume the link state of link1 at the NSTR STA MLD, the NSTR STA MLD may need to defer backoff for a NAVSyncDelay on link1 after link2's transmission. In some embodiments, the NAVSyncDelay may be long enough that a potential PPDU transmission on link1 may be finished within the duration of the NAVSyncDelay. In some embodiments, before the NAVSyncDelay, if the NSTR STA MLD detects a PPDU on link1 with valid TXOP duration, then the NSTR STA MLD may ignore a remaining deaf defer duration. Instead, the received TXOP duration may be used to decide when to use a normal Clear Channel Assessment (CCA) procedure to perform backoff on link1.

Techniques for multi-link operations that involve resuming a link state at a NSTR STA MLD are described in further detail below with reference to FIG. 7 and FIG. 8.

Figure 7:
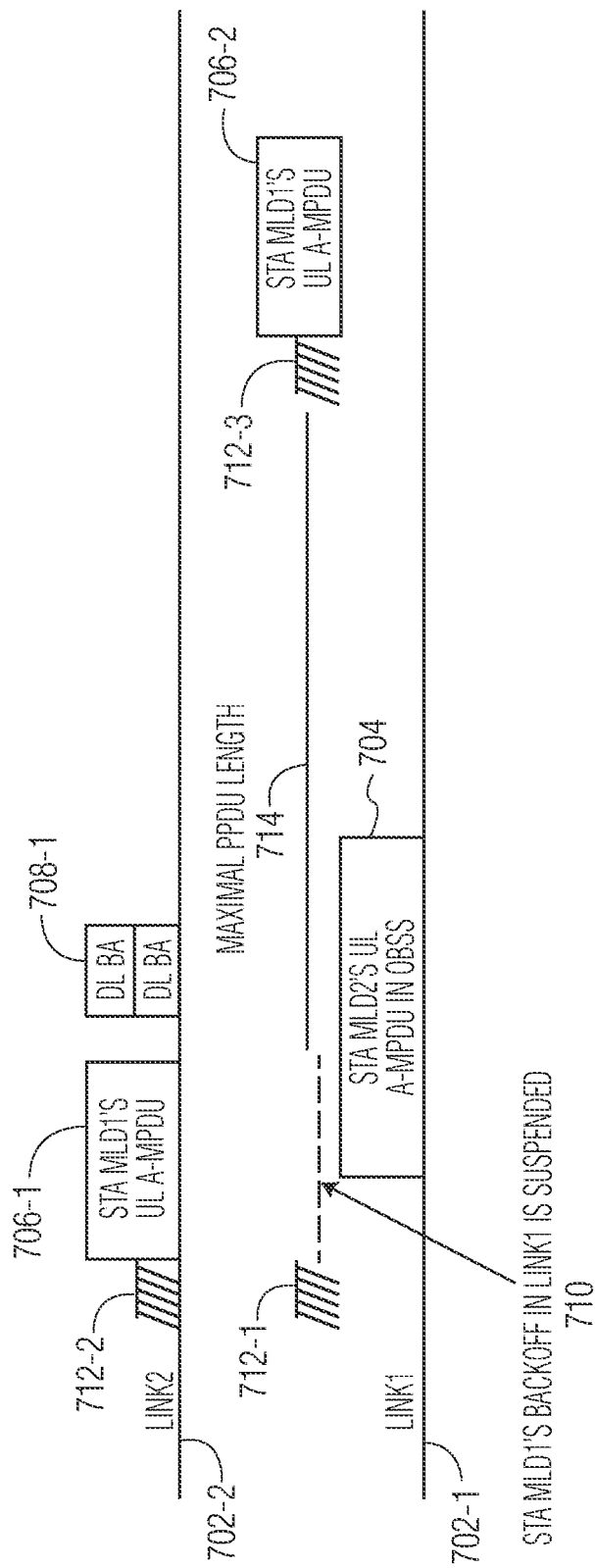
FIG. 7 illustrates an example of a technique that may be used by a NSTR STA MLD to resume a link state in accordance with an embodiment of the invention.

FIG. 7 illustrates an example of a technique that may be used by a NSTR STA MLD to resume a link state in accordance with an embodiment of the invention. With reference to FIG. 7, a first STA MLD (STA MLD1, not shown) with the NSTR capability and a second STA MLD (STA MLD2, not shown) may use two links, e.g., link1 702-1 and link2 702-2, which may use 40 MHz channels to exchange frames with the AP MLDs (not shown). In particular, FIG. 7 shows STA MLD1 as performing a first backoff 712-1 on link1 702-1 and a second backoff 712-2 on link2 702-2 which start and end at a similar time before exchanging frames with the AP MLD.

In some embodiments, after the first backoff 712-1 on link1 702-1 and the second backoff 712-2 on link2 702-2, STA MLD1 may transmit a first UL A-MPDU frame to the AP MLD (e.g., STA MLD1's UL A-MPDU 706-1) on link2 702-2 and suspend STA MLD1's backoff 712-1 on link1 702-1 (shown by dashed line 710). During the transmission of STA MLD1's UL A-MPDU 706-1 on link2 702-2 and STA MLD1's suspended backoff 710 on link1 702-1, STA MLD2 (in a neighbor multi-link BSS) may transmit an UL A-MPDU frame to STA MLD2's associated AP MLD using an OBSS (e.g., STA MLD2's UL A-MPDU in OBSS 704) on link1 702-1. In some embodiments, after receiving STA MLD1's UL A-MPDU 706-1 on link2 702-2 at the AP MLD, the AP MLD may transmit a DL BA frame, DL BA 708-1, on link2 702-2 to STA MLD1 during the transmission of STA MLD2's UL A-MPDU in OBSS 704 on link1 702-1. In such an embodiment, because STA MLD1 has the NSTR capability, STA MLD1 is unaware of STA MLD2's UL A-MPDU in OBSS 704 on link1 702-1. In some embodiments, STA MLD1 may wait to perform a third backoff 712-3 on link1 702-1 until a defer time (e.g., maximal PPDU length 714 or NAVSyncDelay) passes without detecting frames on link2 702-2. An example of maximal PPDU length may be 5.484 ms. In some embodiments, STA MLD1 may wait to perform the third backoff 712-3 on link1 702-1 until a PPDU or frame with TXOP duration information (not shown) is received on link2 702-2 or link1 702-1 at STA MLD1. In such an embodiment, after the time of maximal PPDU length 714 (e.g., NAVSyncDelay) passes without detecting frames on link2 702-2 or the PPDU or frame with TXOP duration information (not shown) is received on link2 702-2 or link1 702-1 at STA MLD1, STA MLD1 performs the third backoff 712-3 per the normal CCA level on link1 702-1 and transmits a second UL A-MPDU frame to the AP MLD (e.g., STA MLD1's UL A-MPDU 706-2) on link1 702-1 that is received by the AP MLD. In such an embodiment, STA MLD1 therefore resumes the link state and continues frame exchange with the AP MLD on multiple links. In some embodiments, if a PPDU with TXOP duration information is received, the remaining deaf defer time may be ignored. Instead, STA MLD1 sets NAV on link1 per the received TXOP duration and follows a normal backoff procedure that may be in accordance with 802.11 communication protocols.

Figure 8:
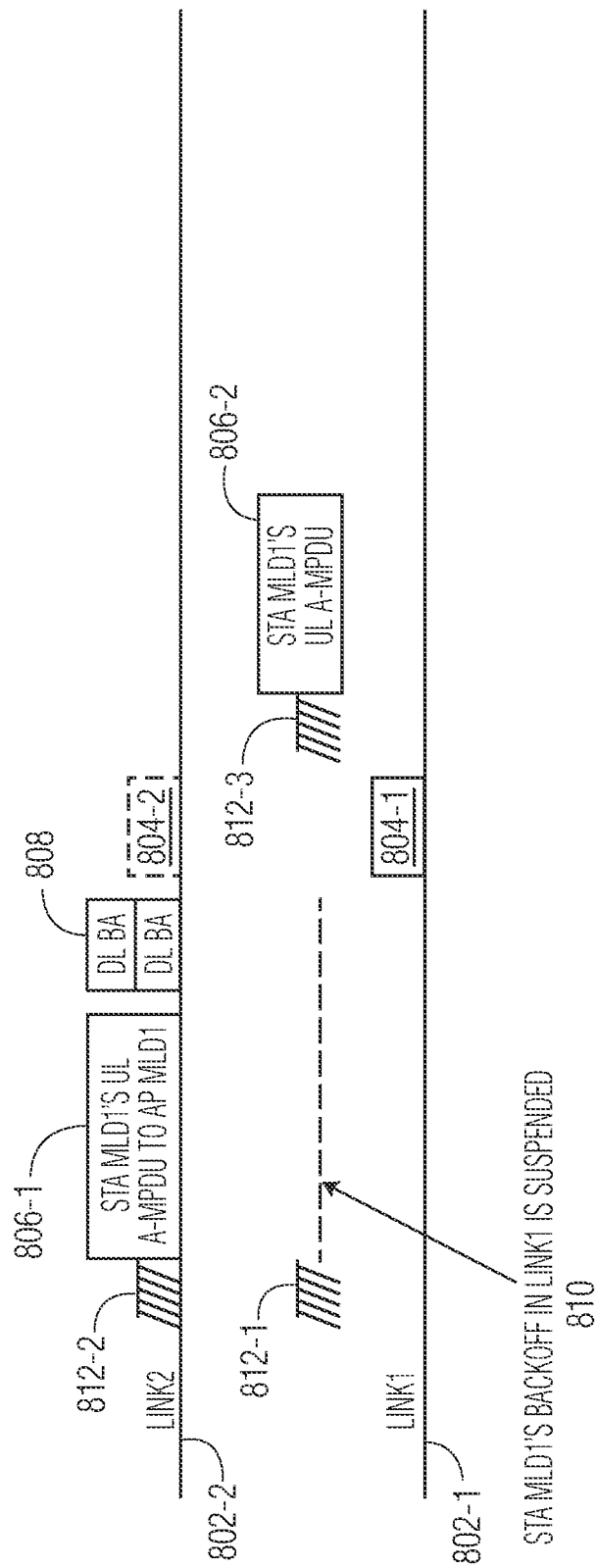
FIG. 8 illustrates another example of a technique that may be used by a NSTR STA MLD to resume a link state in accordance with an embodiment of the invention.

FIG. 8 illustrates another example of a technique that may be used by a NSTR STA MLD to resume a link state in accordance with an embodiment of the invention. With reference to FIG. 8, a first STA MLD (STA MLD1, not shown) with the NSTR capability may use two links, e.g., link1 802-1 and link2 802-2, which may use 40 MHz channels to exchange frames with AP MLDs (not shown). In particular, FIG. 8 shows STA MLD1 as performing a first backoff 812-1 on link1 802-1 and a second backoff 812-2 on link2 802-2 which start and end at a similar time before exchanging frames with the AP MLD.

In some embodiments, after the first backoff 812-1 on link1 802-1 and the second backoff 812-2 on link2 802-2, STA MLD1 may transmit a first UL A-MPDU frame to the AP MLD (e.g., STA MLD1's UL A-MPDU 806-1) on link2 802-2 and suspend STA MLD1's backoff 812-1 on link1 802-1 (shown by dashed line 810). In some embodiments, after receiving STA MLD1's UL A-MPDU 806-1 on link2 802-2 at the AP MLD, the AP MLD may transmit a first DL BA frame, DL BA 808, on link2 802-2 to STA. In some embodiments, after STA MLD1's suspended backoff 810 on link1 802-1, the AP MLD may transmit an announcement 804-1 on link1 802-1 to STA MLD1. In some embodiments, the AP MLD may transmit the announcement 804-2 on link2 802-2 (shown by dashed box) to STA MLD1. As an example, the announcement may indicate activity on link1 802-1 during the transmission of STA MLD1's UL A-MPDU to AP MLD1 806-1 and DL BA 808 on link2 802-2, such that the announcement may be carried with a second DL BA frame or a frame in a separate PPDU. In some embodiments, transmission of the announcement 804-1 on link1 802-1 may be done without following a backoff procedure (e.g., after detecting a medium is idle after STA MLD1's TXOP on link2 802-2). In some embodiments, transmission of the announcement 804-2 on link2 802-2 may be done at a SIFS time after STA MLD1's TXOP (not shown) on link2 802-2. In some embodiments, the announcement may indicate that there was no activity on link1 802-1 during the transmission of STA MLD1's UL A-MPDU to AP MLD1 806-1. In such an embodiment, after receiving the announcement 804-1 on link1 802-1 (or the announcement 804-2 on link2 802-2) at STA MLD1, STA MLD1 sets NAV per the AP MLD1's announcement and resumes the normal backoff procedure. In such an embodiment, STA MLD1 therefore resumes the link state and continues frame exchange with the AP MLD on multiple links.

With reference to FIG. 8, in some embodiments, the announcement (e.g., announcement 804-1 or announcement 804-2) may be an indication about whether an AP MLD's network allocation vector (NAV) of link1 (e.g., link1 802-1) is zero at the end of a notification frame transmission. For example, the announcement may report the AP MLD's NAV timer of link1 to the NSTR STA MLD. In some embodiments, if there is activity on link1, then the AP MLD may additionally report a remaining NAV timer value after the notification frame transmission. In such an embodiment, the indication may be carried in the specific Per-AID TID Information field of a multi-BA frame and identified by a specific AID value, specific TID value, or specific Fragment Number. In another embodiment, the indication may also use a change of compressed BA frame for transmission.

In some embodiments, after the NSTR STA MLD finishes a TXOP on one link (e.g., link1), the NSTR STA MLD may need to synchronize the NSTR STA MLD's medium state on another link (e.g., link2). To synchronize the NSTR STA MLD's medium, the NSTR STA MLD may use one of two synchronization techniques described herein.

According to a first synchronization technique, before a NAVSyncDelay (or a ProbeDelay), the NSTR STA MLD may perform a backoff based on an energy level (i.e., energy detection (ED) level) of, for example, −82 dbm. In some embodiments, if a valid PPDU with TXOP duration is detected, the NSTR STA MLD sets the NAV and performs the backoff based on a CCA level of −82 dbm and the energy level of, for example, −62 dbm. Although certain CCA levels and energy levels are described, other CCA levels and energy levels are possible.

According to a second synchronization technique, before the NAVSyncDelay (or the ProbeDelay), the NSTR STA MLD may perform the backoff based on the energy level that a STA uses for an 802.11 communication protocol symbol detection (e.g., CCA level for PPDU detection). In some embodiments, if a valid PPDU is detected, the NSTR STA MLD does the backoff based on the CCA level for PPDU detection that the NSTR STA MLD selects and the energy level of a value between −82 dbm and −62 dbm. In such an embodiment, the CCA level may be a value that is selected per-OBSS Packet Detect (PD).

According to the second synchronization technique, if the NSTR STA MLD's backoff becomes zero and no valid PPDU is detected within the NAVSyncDelay (or the Probe-Delay), the NSTR STA MLD starts a TXOP with a frame exchange of a Request to Send (RTS) frame and a Clear to Send (CTS) frame. In some embodiments, the received CTS frame from AP MLD1 on link1 resumes the STA MLD's medium state with the help of AP MLD1.

In some embodiments, if STA MLD1 has a non-zero value in a NAV timer on link1 when STA MLD1 starts a NAVSyncDelay timer with an initial value of NAVSyncDelay (e.g. maximal PPDU length) on link1, STA MLD1 may not perform backoff per an ED level of −82 dbm (or a value between −82 dbm and −62 dbm) for transmitting a RTS frame to solicit a CTS frame. In such an embodiment, after STA MLD1 has a zero value in the NAV timer on link1 and before NAVSyncDelay timer becomes 0, STA MLD1 may perform backoff per the ED level of −82 dbm (or a value between −82 dbm and −62 dbm) for transmitting the RTS frame to solicit the CTS frame.

In some embodiments, a NSTR STA MLD may perform a TXOP owner transfer with an associated AP MLD that has simultaneous transmission capability or STR capability after performing backoff on multiple links. As an example, if a backoff counter of the NSTR STA MLD on one link (e.g., link1) becomes 0, the NSTR STA MLD may request a TXOP owner transfer, such that the NSTR STA MLD transfers link1's TXOP owner to the AP MLD that has simultaneous transmission capability or STR capability via a TXOP Owner Transfer Request (TOTR). In such an example, the AP MLD that has simultaneous transmission capability or STR capability may reject the TXOP owner transfer when another link (e.g., link2) will be busy for a long time (e.g., 5 ms NAV timer) or when link2's backoff timer has a large value, e.g., 510. When the AP MLD that has simultaneous transmission capability or STR capability rejects the TXOP owner transfer, the NSTR STA MLD continues the NSTR STA MLD's TXOP on link1.

An example of an AP MLD with a simultaneous transmission capability or a STR capability rejecting a TXOP owner transfer request of a NSTR STA MLD is described in further detail below with reference to FIG. 9.

Figure 9:
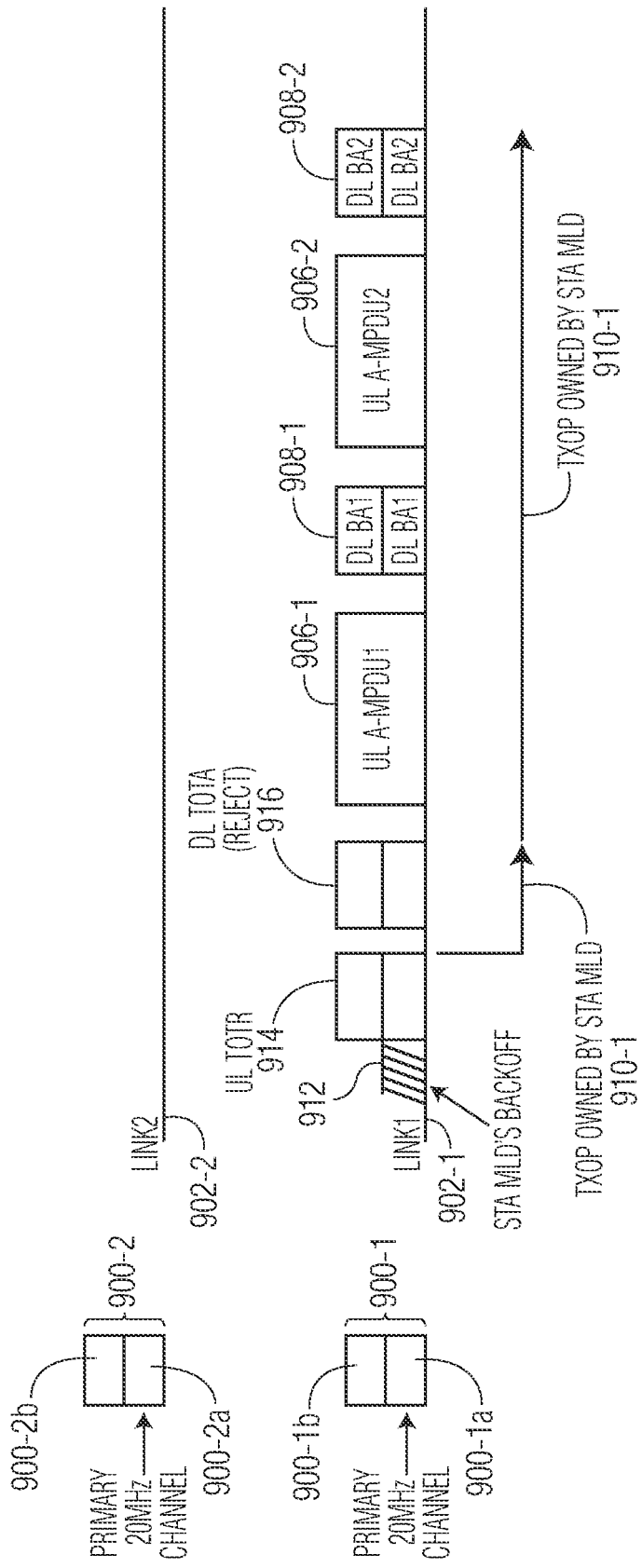
FIG. 9 illustrates an example of an AP MLD rejecting a Transmission Opportunity (TXOP) owner transfer request of a NSTR STA MLD.

FIG. 9 illustrates an example of an AP MLD rejecting a TXOP owner transfer request of a NSTR STA MLD. With reference to FIG. 9, the NSTR STA MLD (not shown) and the AP MLD that has simultaneous transmission capability or STR capability (not shown) may use two links, e.g., link1 902-1 and link2 902-2, to exchange frames. In particular, FIG. 9 shows link1 902-1 as using a 40 MHz channel 900-1 which includes a primary 20 MHz channel 900-1a and a secondary 20 MHz channel 900-1b, and link2 902-2 as using a 40 MHz channel 900-2 which includes a primary 20 MHz channel 900-2a and a secondary 20 MHz channel 900-2b.

In some embodiments, after a backoff 912 by the NSTR STA MLD on link1 902-1 (shown by "STA MLD's backoff"), the NSTR STA MLD may transmit a UL TOTR frame, UL TOTR 914, on link1 902-1 to the AP MLD that begins a TXOP 910-1 owned by the NSTR STA MLD (shown as "TXOP owned by STA MLD"), such that UL TOTR 914 includes a TOTR to perform a TXOP owner transfer. In such an embodiment, the AP MLD may respond to UL TOTR 914 on link1 902-1 by transmitting a DL TXOP Owner Transfer Ack (TOTA) frame, DL TOTA 916, on link1 902-1 to the NSTR STA MLD, such that DL TOTA 916 rejects the TOTR to perform the TXOP owner transfer. In such an embodiment, after receiving DL TOTA 916 on link1 902-1 at the NSTR STA MLD, the TXOP 910-1 owned by the NSTR STA MLD continues (shown as "TXOP owned by STA MLD") during frame exchange with the AP MLD. In some embodiments, the NSTR STA MLD continues frame exchange with the AP MLD by transmitting a first UL A-MPDU frame, UL A-MPDU1 906-1, on link1 902-1 to the AP MLD. In such an embodiment, after receiving UL A-MPDU1 906-1 on link1 902-1 at the AP MLD, the AP MLD may transmit a first DL BA frame, DL BA1 908-1, on link1 902-1 to the NSTR STA MLD. In some embodiments, after receiving DL BA1 908-1 on link1 902-1 at the NSTR STA MLD, the NSTR STA MLD transmits a second UL A-MPDU frame, UL A-MPDU2 906-2, on link1 902-1 to the AP MLD. In such an embodiment, after receiving UL A-MPDU2 906-2 on link1 902-1 at the AP MLD, the AP MLD may transmit a second DL BA frame, DL BA2 908-2, on link1 902-1 to the NSTR STA MLD, such that DL BA2 908-2 is received by the NSTR STA MLD.

With reference to FIG. 9, if the AP MLD were to accept the TOTR to perform the TXOP owner transfer, then the remaining time of the TXOP may have a new TXOP owner (e.g., AP MLD). In some embodiments, the AP MLD may transmit TOTA to accept the NSTR STA MLD's TOTR to perform the TXOP owner transfer. In such an embodiment, if the AP MLD accepts the TOTR by using TOTA, then the AP MLD schedules UL PPDUs from the NSTR STA MLD, such that the UL PPDUs start at the same time (e.g., have an aligned transmission start time on multiple links). When the AP MLD accepts the TXOP owner transfer, the AP MLD begins to own the remaining time of the TXOP on link1. In such an embodiment, when both links (e.g., link1 and link2) have the same TXOP owner, TXOP recovery is easy to perform when a transmission error occurs.

Examples of an AP MLD with a simultaneous transmission capability or a STR capability accepting a TXOP owner transfer request of a NSTR STA MLD are described in further detail below with reference to FIGS. 10A-10C.

Figure 10A:
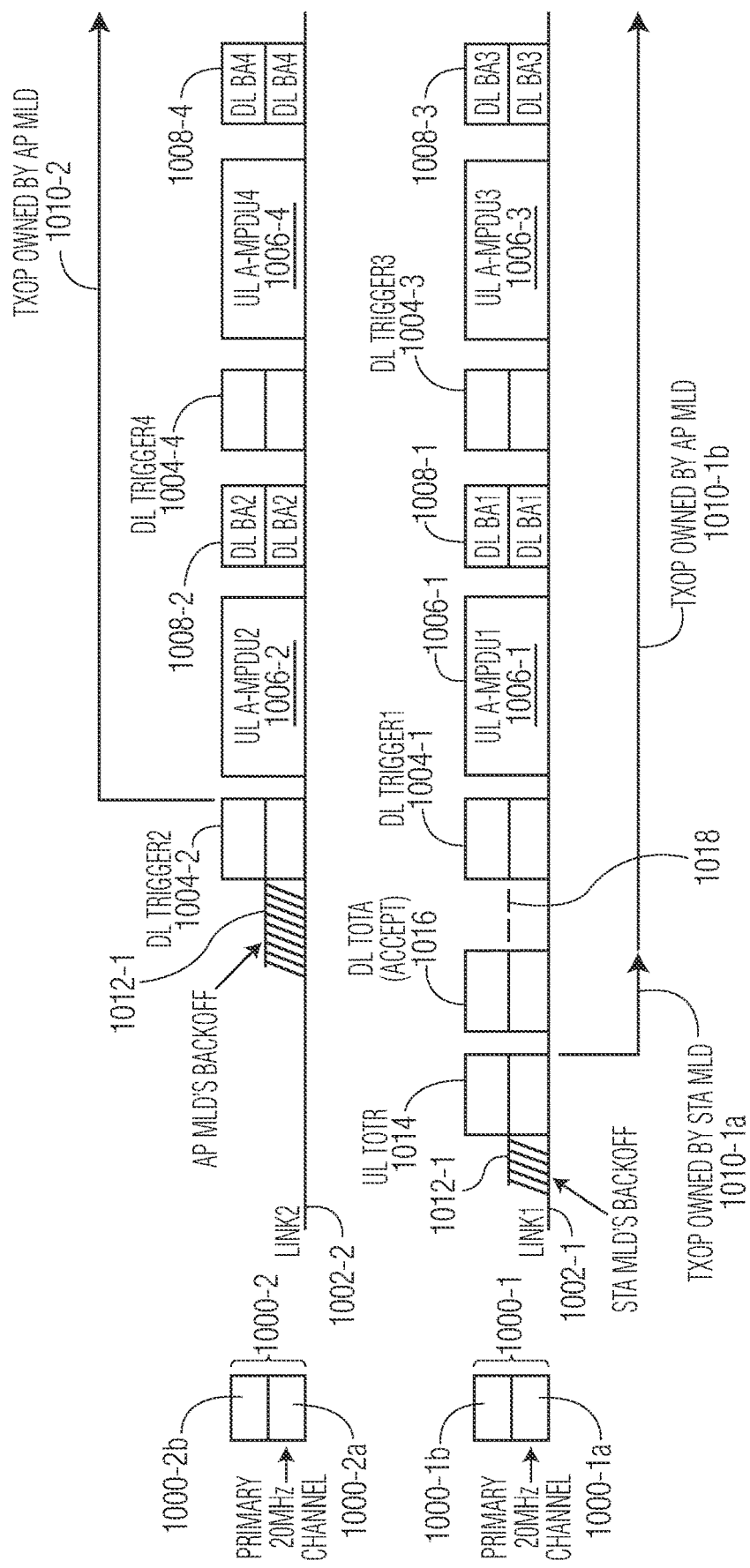
FIG. 10A illustrates an example of an AP MLD accepting a TXOP owner transfer request of a NSTR STA MLD.

FIG. 10A illustrates an example of an AP MLD accepting a TXOP owner transfer request of a NSTR STA MLD. With reference to FIG. 10A, the NSTR STA MLD (not shown) and the AP MLD that has simultaneous transmission capability or STR capability (not shown) may use two links, e.g., link1 1002-1 and link2 1002-2, to exchange frames. In particular, FIG. 10A shows link1 1002-1 as using a 40 MHz channel 1000-1 which includes a primary 20 MHz channel 1000-1a and a secondary 20 MHz channel 1000-1b, and link2 1002-2 as using a 40 MHz channel 1000-2 which includes a primary 20 MHz channel 1000-2a and a secondary 20 MHz channel 1000-2b.

In some embodiments, after a first backoff 1012-1 by the NSTR STA MLD on link1 1002-1 (shown by "STA MLD's backoff"), the NSTR STA MLD may transmit a UL TOTR frame, UL TOTR 1014, on link1 1002-1 to the AP MLD that begins a TXOP 1010-1a owned by the NSTR STA MLD (shown as "TXOP owned by STA MLD"), such that UL TOTR 1014 includes a TOTR to perform a TXOP owner transfer. In such an embodiment, the AP MLD may respond to the UL TOTR frame 1014 on link1 1002-1 by transmitting a DL TOTA frame, DL TOTA 1016, on link1 1002-1 to the NSTR STA MLD, such that DL TOTA 1016 accepts the TOTR to perform the TXOP owner transfer. In such an embodiment, after receiving DL TOTA 1016 on link1 1002-1 at the NSTR STA MLD, the TXOP 1010-1a (owned by the STA MLD) transfers to TXOP 1010-1b owned by the AP MLD (shown as "TXOP owned by AP MLD") starts on link1 1002-1. In such an embodiment, when the TXOP 1010-1b owned by the AP MLD starts on link1 1002-1, a Defer gap 1018 occurs before frame exchange continues on link1 1002-1. In some embodiments, a second backoff 1012-2 by the AP MLD on link2 1002-2 (shown by "AP MLD's backoff") may end at the same time as the Defer gap 1018. After the end of the second backoff 1012-2 on link2 1002-2 and the Defer gap 1018 on link1 1002-1, the NSTR STA MLD may continue frame exchange with the AP MLD. In some embodiments, frame exchange may continue when the AP MLD transmits a first DL Trigger frame, DL Trigger1 1004-1, on link1 1002-1 to the NSTR STA MLD and a second DL Trigger frame, DL Trigger2 1004-2, on link2 1002-2 to the NSTR STA MLD, such that DL Trigger1 1004-1 and DL Trigger2 1004-2 have the same transmission start/end time. In some embodiments, after receiving DL Trigger2 1004-2 at the NSTR STA MLD, a TXOP 1010-2 owned by the AP MLD (shown as "TXOP owned by AP MLD") starts on link2 1002-2.

In some embodiments, after receiving DL Trigger1 1004-1 on link1 1002-1 and DL Trigger2 1004-2 on link2 1002-2 at the NSTR STA MLD, the NSTR STA MLD transmits a first UL A-MPDU frame, UL A-MPDU1 1006-1, on link1 1002-1 to the AP MLD and a second UL A-MPDU frame, UL A-MPDU2 1006-2, on link2 1002-2 to the AP MLD, such that UL A-MPDU1 1006-1 and UL A-MPDU2 1006-2 have the same transmission start/end time. In such an embodiment, after receiving UL A-MPDU1 1006-1 on link1 1002-1 and UL A-MPDU2 1006-2 on link2 1002-2 at the AP MLD, the AP MLD may transmit a first DL BA frame, DL BA1 1008-1, on link1 1002-1 to the NSTR STA MLD and a second DL BA frame, DL BA2 1008-2, on link2 1002-2 to the NSTR STA MLD, such that DL BA1 1008-1 and DL BA2 1008-2 have the same transmission start/end time. In some embodiments, after the AP MLD transmits DL BA1 1008-1 on link1 1002-1 and DL BA2 1008-2 on link2 1002-2 to the NSTR STA MLD, the AP MLD transmits a third DL Trigger frame, DL Trigger3 1004-3, on link1 1002-1 to the NSTR STA MLD and a fourth DL Trigger frame, DL Trigger4 1004-4, on link2 1002-2 to the NSTR STA MLD, such that DL Trigger3 1004-3 and DL Trigger4 1004-4 have the same transmission start/end time. In some embodiments, after receiving DL Trigger3 1004-3 on link1 1002-1 and DL Trigger4 1004-4 on link2 1002-2 at the NSTR STA MLD, the NSTR STA MLD transmits a third UL A-MPDU frame, UL A-MPDU3 1006-3, on link1 1002-1 to the AP MLD and a fourth UL A-MPDU frame, UL A-MPDU4 1006-4, on link2 1002-2 to the AP MLD, such that UL A-MPDU3 1006-3 and UL A-MPDU4 1006-4 have the same transmission start/end time. In such an embodiment, after receiving UL A-MPDU3 1006-3 on link1 1002-1 and UL A-MPDU4 1006-4 on link2 1002-2 at the AP MLD, the AP MLD may transmit a third DL BA frame, DL BA3 1008-3, on link1 1002-1 to the NSTR STA MLD and a fourth DL BA frame, DL BA4 1008-4, on link2 1002-2 to the NSTR STA MLD, such that DL BA3 1008-3 and DL BA4 1008-4 have the same transmission start/end time.

Figure 10B:
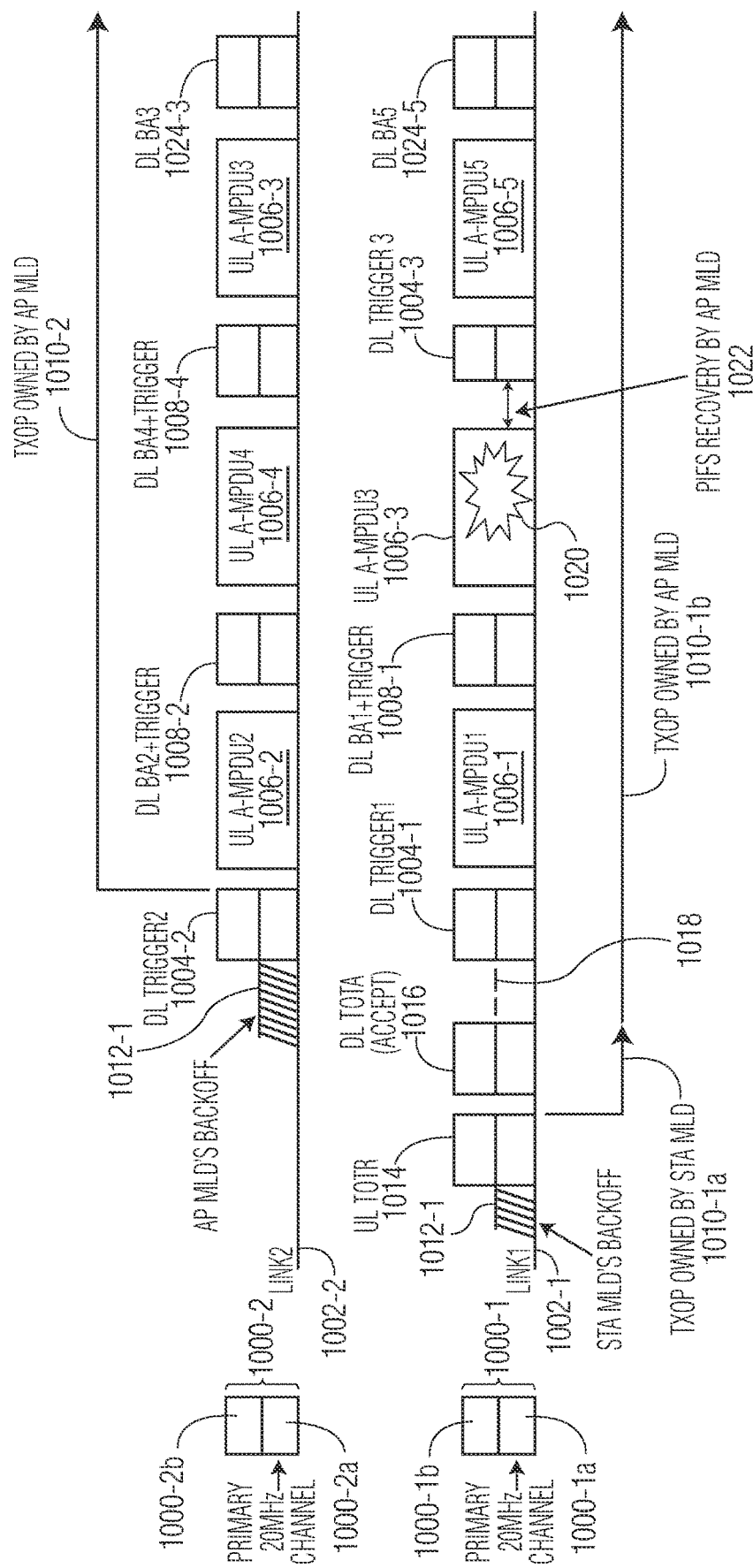
FIG. 10B illustrates another example of an AP MLD accepting a TXOP owner transfer request of a NSTR STA MLD.

FIG. 10B illustrates another example of an AP MLD accepting a TXOP owner transfer request of a NSTR STA MLD. With reference to FIG. 10B, the NSTR STA MLD (not shown) and the AP MLD that has simultaneous transmission capability or STR capability (not shown) may use two links, e.g., link1 1002-1 and link2 1002-2, to exchange frames. In particular, FIG. 10B shows link1 1002-1 as using a 40 MHz channel 1000-1 which includes a primary 20 MHz channel 1000-1a and a secondary 20 MHz channel 1000-1b, and link2 1002-2 as using a 40 MHz channel 1000-2 which includes a primary 20 MHz channel 1000-2a and a secondary 20 MHz channel 1000-2b.

In some embodiments, after a first backoff 1012-1 by the NSTR STA MLD on link1 1002-1 (shown by "STA MLD's backoff"), the NSTR STA MLD may transmit a UL TOTR frame, UL TOTR 1014, on link1 1002-1 to the AP MLD that begins a TXOP 1010-1a owned by the NSTR STA MLD (shown as "TXOP owned by STA MLD"), such that UL TOTR 1014 includes a TOTR to perform a TXOP owner transfer. In such an embodiment, the AP MLD may respond to UL TOTR 1014 on link1 1002-1 by transmitting a DL TOTA frame, DL TOTA 1016, on link1 1002-1 to the NSTR STA MLD, such that DL TOTA 1016 accepts the TOTR to perform the TXOP owner transfer. In such an embodiment, after receiving DL TOTA 1016 on link1 1002-1 at the NSTR STA MLD, the TXOP 1010-1a (owned by the STA MLD) transfers to TXOP 1010-1b owned by the AP MLD (shown as "TXOP owned by AP MLD") starts on link1 1002-1. In such an embodiment, when the TXOP 1010-1b (owned by the AP MLD) starts on link1 1002-1, the AP MLD defers transmission (shown by Defer gap 1018) before frame exchange continues on link1 1002-1. In some embodiments, a second backoff 1012-2 by the AP MLD on link2 1002-2 (shown by "AP MLD's backoff") may end at the same time as the Defer gap 1018. After the end of the second backoff 1012-2 on link2 1002-2 and the Defer gap 1018 on link1 1002-1, the NSTR STA MLD may continue frame exchange with the AP MLD. In some embodiments, frame exchange may continue when the AP MLD transmits a first DL Trigger frame, DL Trigger1 1004-1, on link1 1002-1 to the NSTR STA MLD and a second DL Trigger frame, DL Trigger2 1004-2, on link2 1002-2 to the NSTR STA MLD, such that DL Trigger1 1004-1 and DL Trigger2 1004-2 have the same transmission start/end time. In some embodiments, after receiving DL Trigger2 1004-2 at the NSTR STA MLD, a TXOP 1010-2 owned by the AP MLD (shown as "TXOP owned by AP MLD") starts on link2 1002-2.

In some embodiments, after receiving DL Trigger1 1004-1 on link1 1002-1 and DL Trigger2 1004-2 on link2 1002-2 at the NSTR STA MLD, the NSTR STA MLD transmits a first UL A-MPDU frame, UL A-MPDU1 1006-1, on link1 1002-1 to the AP MLD and a second UL A-MPDU frame, UL A-MPDU2 1006-2, on link2 1002-2 to the AP MLD, such that UL A-MPDU1 1006-1 and UL A-MPDU2 1006-2 have the same transmission start/end time. In such an embodiment, after receiving UL A-MPDU1 1006-1 on link1 1002-1 and UL A-MPDU2 1006-2 on link2 1002-2 at the AP MLD, the AP MLD may transmit a first DL BA with Trigger frame, DL BA1+Trigger 1008-1, on link1 1002-1 to the NSTR STA MLD and a second DL BA with Trigger frame, DL BA2+Trigger 1008-2, on link2 1002-2 to the NSTR STA MLD, such that DL BA1+Trigger 1008-1 and DL BA2+Trigger 1008-2 have the same transmission start/end time. In some embodiments, after receiving DL BA1+Trigger 1008-1 on link1 1002-1 and DL BA2+Trigger 1008-2 on link2 1002-2 at the NSTR STA MLD, the NSTR STA MLD attempts to transmit a third UL A-MPDU frame, UL A-MPDU3 1006-3, on link1 1002-1 to the AP MLD and transmits a fourth UL A-MPDU frame, UL A-MPDU4 1006-4, on link2 1002-2 to the AP MLD, such that UL A-MPDU3 1006-3 and UL A-MPDU4 1006-4 have the same transmission start/end time. However, in such an embodiment, transmission of UL A-MPDU3 1006-3 experiences an error 1020. Examples of the error 1020 may include the NSTR STA MLD improperly transmitting UL A-MPDU3 1006-3 or the AP MLD not receiving/detecting UL A-MPDU3 1006-3 on link1 1002-1.

In such an embodiment, after the error 1020, the AP MLD initiates a TXOP recover after PIFS 1022 on link1 1002-1 before transmitting a third DL Trigger, DL Trigger3 1004-3, on link1 1002-1. As an example, DL Trigger3 1004-3 may request the NSTR STA MLD retransmit UL A-MPDU3 1006-3. In addition to DL Trigger3 1004-3 on link1 1002-1, the AP MLD transmits another DL BA with Trigger frame, DL BA4+Trigger 1008-4, to the NSTR STA MLD on link2 1002-2 in response to receiving UL A-MPDU4 1006-4 on link2 1002-2. In such an embodiment, after receiving DL Trigger3 1004-3 and DL BA4+Trigger 1008-4 at the NSTR STA MLD, the NSTR STA MLD may retransmit UL A-MPDU3 1006-3 on link2 1002-2 to the AP MLD and transmit a fifth UL A-MPDU frame, UL A-MPDU5 1006-5, on link1 1002-1 to the AP MLD, such that UL A-MPDU3 1006-3 and UL A-MPDU5 1006-5 have the same transmission start/end time. In some embodiments, after receiving retransmitted UL A-MPDU3 1006-3 on link2 1002-2 and UL A-MPDU5 1006-5 on link1 1002-1 at the AP MLD, the AP MLD may transmit a DL BA frame, DL BA3 1024-3, on link2 1002-2 to the NSTR STA MLD and another DL BA frame, DL BA5 1024-5, on link1 1002-1 to the NSTR STA MLD, such that DL BA3 1024-3 and DL BA5 1024-5 have the same transmission start/end time.

Figure 10C:
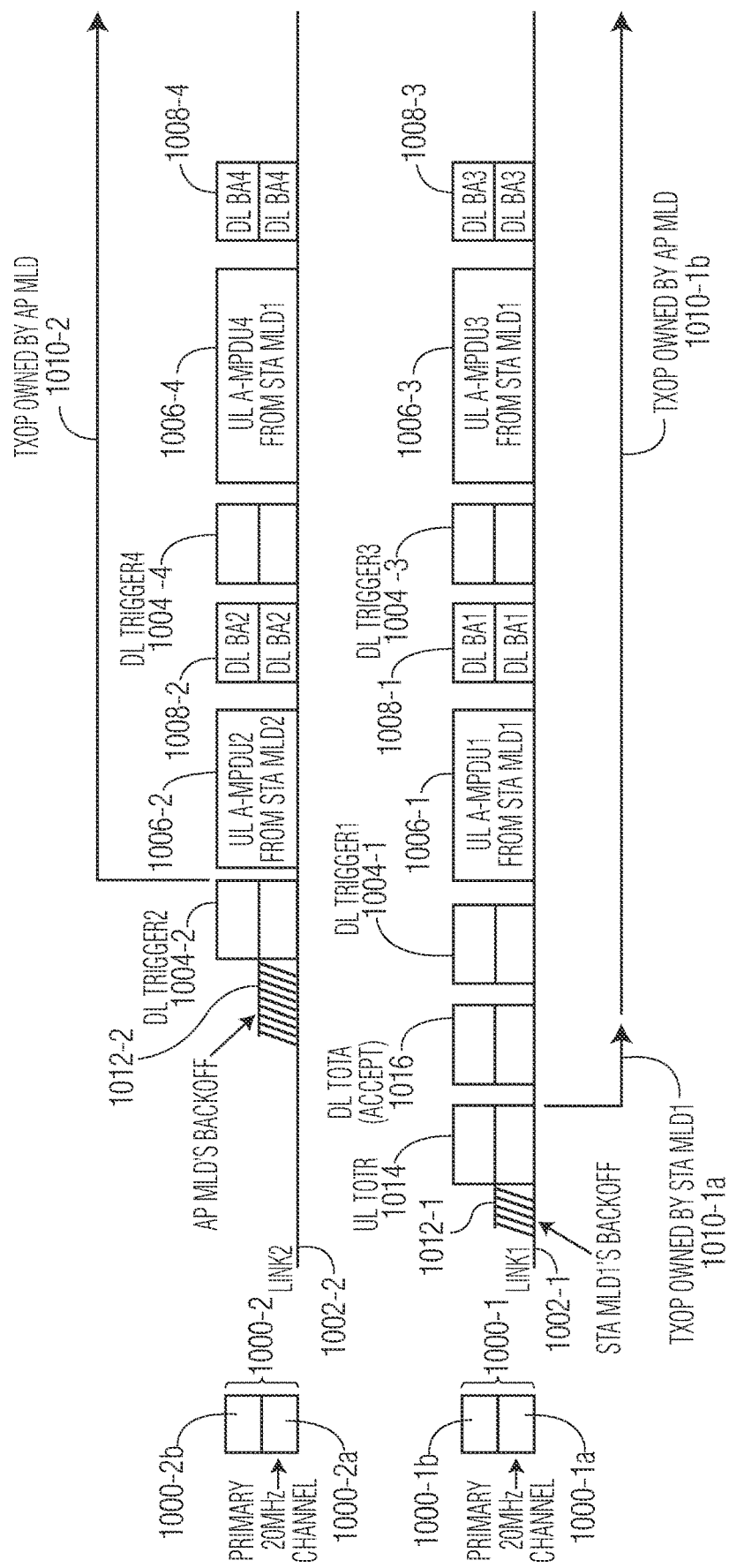
FIG. 10C illustrates another example of an AP MLD accepting a TXOP owner transfer request of a NSTR STA MLD.

FIG. 10C illustrates another example of an AP MLD accepting a TXOP owner transfer request of a NSTR STA MLD. With reference to FIG. 10C, a first NSTR STA MLD, STA MLD1 (not shown), and the AP MLD that has simultaneous transmission capability or STR capability (not shown) may use two links, e.g., link1 1002-1 and link2 1002-2, to exchange frames. In particular, FIG. 10C shows link1 1002-1 as using a 40 MHz channel 1000-1 which includes a primary 20 MHz channel 1000-1a and a secondary 20 MHz channel 1000-1b, and link2 1002-2 as using a 40 MHz channel 1000-2 which includes a primary 20 MHz channel 1000-2a and a secondary 20 MHz channel 1000-2b.

In some embodiments, after a first backoff 1012-1 by STA MLD1 on link1 1002-1 (shown by "STA MLD1's backoff"), STA MLD1 may transmit a UL TOTR frame, UL TOTR 1014, on link1 1002-1 to the AP MLD that begins a TXOP 1010-1a owned by the STA MLD1 (shown as "TXOP owned by STA MLD1"), such that UL TOTR 1014 includes a TOTR to perform a TXOP owner transfer. In such an embodiment, the AP MLD may respond to UL TOTR 1014 on link1 1002-1 by transmitting a DL TOTA frame, DL TOTA 1016, on link1 1002-1 to STA MLD1, such that DL TOTA 1016 accepts the TOTR to perform the TXOP owner transfer and schedules future UL PPDUs (e.g., A-MPDUs) from STA MLD1 with a SIFS interframe space between DL TOTA 1016 and a DL Trigger frame that follows DL TOTA 1016 (shown by the space between DL TOTA 1016 on link1 1002-1 and DL Trigger1 1004-1). However, if the AP MLD is unable to solicit simultaneous UL transmission from STA MLD1, the AP MLD may exchange frames with another STA MLD (e.g., STA MLD2). In such an embodiment, simultaneous transmission with STA MLD1 may start from a later frame exchange in a TXOP.

In such an embodiment, after receiving DL TOTA 1016 on link1 1002-1 at STA MLD1, the TXOP 1010-1a (owned by the STA MLD) transfers to TXOP 1010-1b owned by the AP MLD (shown as "TXOP owned by AP MLD") begins on link1 1002-1. In such an embodiment, the AP MLD is unable to solicit simultaneous UL transmission from STA MLD1, causing the AP MLD to exchange frames with STA MLD2 on link2 1002-2 until the later frame exchange in the TXOP 1010-1b. In some embodiments, after the TXOP 1010-1b (owned by the AP MLD) starts on link1 1002-1, the AP MLD transmits a first DL Trigger frame, DL Trigger1 1004-1, on link1 1002-1 to the STA MLD1. In such an embodiment, after receiving DL Trigger1 1004-1 on link1 1002-1 at STA MLD1, STA MLD1 may transmit a first UL A-MPDU frame, UL A-MPDU1 from STA MLD1 1006-1, on link1 1002-1 to the AP MLD.

In some embodiments, a second backoff 1012-2 by the AP MLD on link2 1002-2 (shown by "AP MLD's backoff") may end during the transmission of DL Trigger1 1004-1, such that when the second backoff 1012-2 on link2 1002-2 ends, the AP MLD transmits a second DL Trigger frame, DL Trigger2 1004-2, on link2 1002-2 to STA MLD2. In such an embodiment, after receiving DL Trigger2 1004-2 on link2 1002-2 at STA MLD2, STA MLD2 may transmit a second UL A-MPDU frame, UL A-MPDU2 from STA MLD2 1006-2, on link2 1002-2 to the AP MLD, such that UL A-MPDU2 from STA MLD2 1006-2 and UL A-MPDU1 from STA MLD1 1006-1 have the same transmission start/end time.

In some embodiments, after the AP MLD receives UL A-MPDU1 from STA MLD1 1006-1 on link1 1002-1 and UL A-MPDU2 from STA MLD2 1006-2 on link2 1002-2, the AP MLD transmits a first DL BA frame, DL BA1 1008-1, on link1 1002-1 to STA MLD1 and a second DL BA frame, DL BA2 1008-2 on link2 1002-2 to the STA MLD2, such that DL BA1 1008-1 and DL BA2 1008-2 have the same transmission start/end time. In some embodiments, after the AP MLD transmits DL BA1 1008-1 on link1 1002-1 and DL BA2 1008-2 on link2 1002-2, the AP MLD may start simultaneous transmission with STA MLD1, such that the AP MLD transmits a third DL Trigger frame, DL Trigger3 1004-3, on link1 1002-1 to STA MLD1 and a fourth DL Trigger frame, DL Trigger4 1004-4, on link2 1002-2 to STA MLD1, such that DL Trigger3 1004-3 and DL Trigger4 1004-4 have the same transmission start/end time.

In some embodiments, after receiving DL Trigger3 1004-3 on link1 1002-1 and DL Trigger4 1004-4 on link2 1002-2 at STA MLD1, STA MLD1 transmits a third UL A-MPDU frame, UL A-MPDU3 from STA MLD1 1006-3, on link1 1002-1 to the AP MLD and a fourth UL A-MPDU frame, UL A-MPDU4 from STA MLD1 1006-4, on link2 1002-2 to the AP MLD, such that UL A-MPDU3 from STA MLD1 1006-3 and UL A-MPDU4 from STA MLD1 1006-4 have the same transmission start/end time. In such an embodiment, after receiving UL A-MPDU3 1006-3 on link1 1002-1 and UL A-MPDU4 1006-4 on link2 1002-2 at the AP MLD, the AP MLD may transmit a third DL BA frame, DL BA3 1008-3, on link1 1002-1 to STA MLD1 and a fourth DL BA frame, DL BA4 1008-4, on link2 1002-2 to STA MLD1, such that DL BA3 1008-3 and DL BA4 1008-4 have the same transmission start/end time.

With reference to FIG. 10C, in some embodiments, UL TOTR 1014 and DL TOTA 1016 may be replaced by a Reverse Direction (RD) operation. As an example, the RD operation may involve the TXOP owner being transferred if the RD operation is the first frame exchange of a TXOP (e.g., TXOP owned by STA MLD1 1010-1*a*). As another example, a duration of an Ack frame may indicate whether a RD operation request is accepted or not, such that an Ack with a rejected indication may avoid backoff by a STA MLD. In such an example, other fields of the Ack frame may be used to indicate whether the RD operation request is accepted or not.

In some embodiments, if the backoff counter of STA MLD1 in one link (e.g., link1) becomes 0, STA MLD1 may start transmitting data frames and/or management frames on the link where the data frames and/or management frames carry an indication that the STA MLD wants simultaneous transmission on another link (e.g., link2). As an example, when the STA MLD wants simultaneous transmission on another link, the STA MLD may perform a soft simultaneous transmission request. In one embodiment of the soft simultaneous transmission request, the AP MLD may try to schedule simultaneous transmission without changing the TXOP owner, if possible. In such an embodiment, each link (e.g., link1 and link2) may be owned by different MLDs (e.g., STA MLD1 or STA MLD2), such that STA MLD1 may be the TXOP owner on link1 and STA MLD2 may be the TXOP owner on link2. Furthermore, in such an embodiment, a responding MCS/rate rule may not be followed to allow the STA MLD's UL PPDUs on each link to start at the same time. In another embodiment of the soft simultaneous transmission request, the AP MLD may schedule simultaneous transmission and change the TXOP owner. In such an embodiment, each link (e.g., link1 and link2) may be owned by the AP MLD, such that the AP MLD may notify the STA MLD of the TXOP owner transfer via, for example, a DL BA with Trigger frame, in which the DL BA carries an indication of the TXOP owner transfer and then transmits a separate trigger. Furthermore, in such an embodiment, one of three transmission techniques described herein may be used to let STA MLD's UL PPDUs on link1 and link2 start at the same time. According to a first transmission technique, the responding MCS/rate rule may not be followed. According to a second transmission technique, the BA bitmap size (e.g., 256) may be longer than the negotiated BA buffer size (e.g., 64). According to a third transmission technique, additional dummy Per-AID TID fields may be added.

Examples of STA MLDs performing soft simultaneous transmission requests are described in further detail below with reference to FIGS. 11A-11B.

Figure 11A:
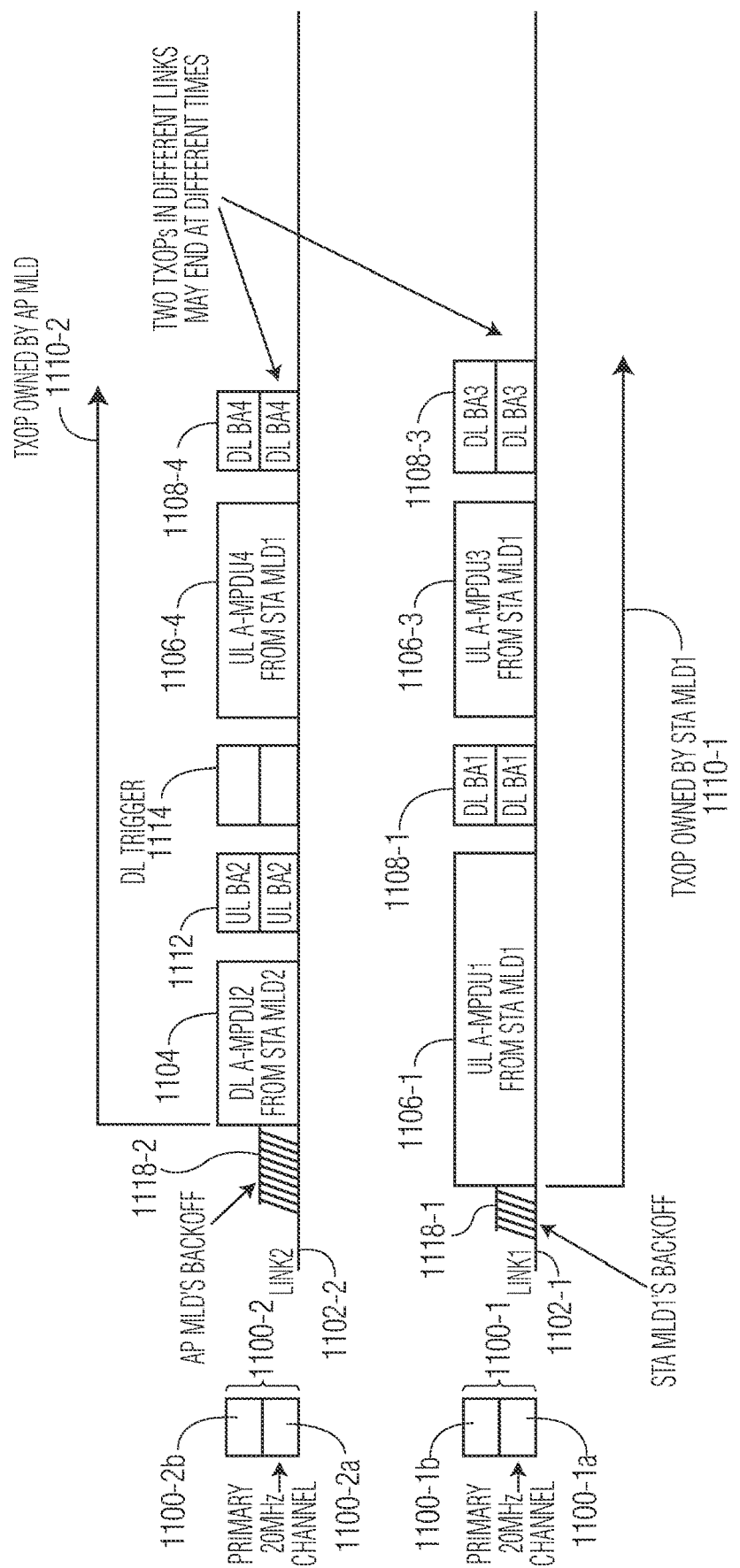
FIG. 11A illustrates an example of a STA MLD performing a soft simultaneous transmission request.

FIG. 11A illustrates an example of a STA MLD performing a soft simultaneous transmission request. With reference to FIG. 11A, a first NSTR STA MLD, STA MLD1 (not shown), and the AP MLD that has simultaneous transmission capability or STR capability (not shown) may use two links, e.g., link1 1102-1 and link2 1102-2, to exchange frames. In particular, FIG. 11A shows link1 1102-1 as using a 40 MHz channel 1100-1 which includes a primary 20 MHz channel 1100-1*a* and a secondary 20 MHz channel 1100-1*b*, and link2 1102-2 as using a 40 MHz channel 1100-2 which includes a primary 20 MHz channel 1100-2*a* and a secondary 20 MHz channel 1100-2*b*.

In some embodiments, after a first backoff 1118-1 by STA MLD1 on link1 1102-1 (shown by "STA MLD1's backoff"), STA MLD1 may transmit a first UL A-MPDU frame, UL A-MPDU1 from STA MLD1 1106-1, on link1 1102-1 to the AP MLD, such that transmission of UL A-MPDU1 from STA MLD1 1106-1 begins a first TXOP owned by STA MLD1 1110-1 (shown as "TXOP owned by STA MLD1"). In some embodiments, after a second backoff 1118-2 by the AP MLD on link2 (shown by "AP MLD's backoff"), the AP MLD may transmit a DL A-MPDU frame, DL A-MPDU2 to STA MLD2 1104, to a second STA MLD, STA MLD2, on link2 1102-2. In such an embodiment, transmission of DL A-MPDU2 to STA MLD2 1104 begins a second TXOP owned by the AP MLD 1110-2 (shown as "TXOP owned by AP MLD") on link2 1102-2.

In some embodiments, after receiving DL A-MPDU2 to STA MLD2 1104 on link2 1102-2 at STA MLD2, STA MLD2 may transmit an UL BA frame, UL BA2 1112, on link2 1102-2 to the AP MLD, such that the transmission end time of UL BA2 1112 on link2 1102-2 is aligned with the transmission end time of UL A-MPDU1 from STA MLD1 1106-1 on link1 1102-1. In some embodiments, after receiving UL A-MPDU1 from STA MLD1 1106-1 on link1 1102-1 and UL BA2 1112 on link2 1102-2 at the AP MLD, the AP MLD may transmit a first DL BA frame, DL BA1 1108-1, on link1 1102-1 to STA MLD1 and a DL Trigger frame, DL Trigger 1114, on link2 1102-2 to STA MLD1. As an example, the transmission of DL Trigger 1114 on link2 1102-2 to STA MLD1 may be an attempt to schedule simultaneous transmission from STA MLD1 without changing the TXOP owner on link1 1102-1.

In some embodiments, after receiving DL Trigger 1114 on link2 1102-2 and DL BA1 1108-1 on link1 1102-1 at STA MLD1, STA MLD1 may transmit a third UL A-MPDU frame, UL A-MPDU3 from STA MLD1 1106-3, on link1 1102-1 to the AP MLD and a fourth UL A-MPDU frame, UL A-MPDU4 from STA MLD1 1106-4, on link2 1102-2 to the AP MLD. In such an embodiment, after receiving UL A-MPDU3 from STA MLD1 1106-3 on link1 1102-1 and UL A-MPDU4 from STA MLD1 1106-4 on link2 1102-2 at the AP MLD, the AP MLD transmits a third DL BA frame, DL BA3 1108-3, on link1 1102-1 to STA MLD1 and a fourth DL BA frame, DL BA4 1108-4, on link2 1102-2 to STA MLD1, such that DL BA3 1108-3 and DL BA4 1108-4 are each received at STA MLD1. In some embodiments, the first TXOP owned by STA MLD1 1110-1 on link1 1102-1 and the second TXOP owned by AP MLD 1110-2 on link2 1102-2 may end at different times.

Figure 11B:
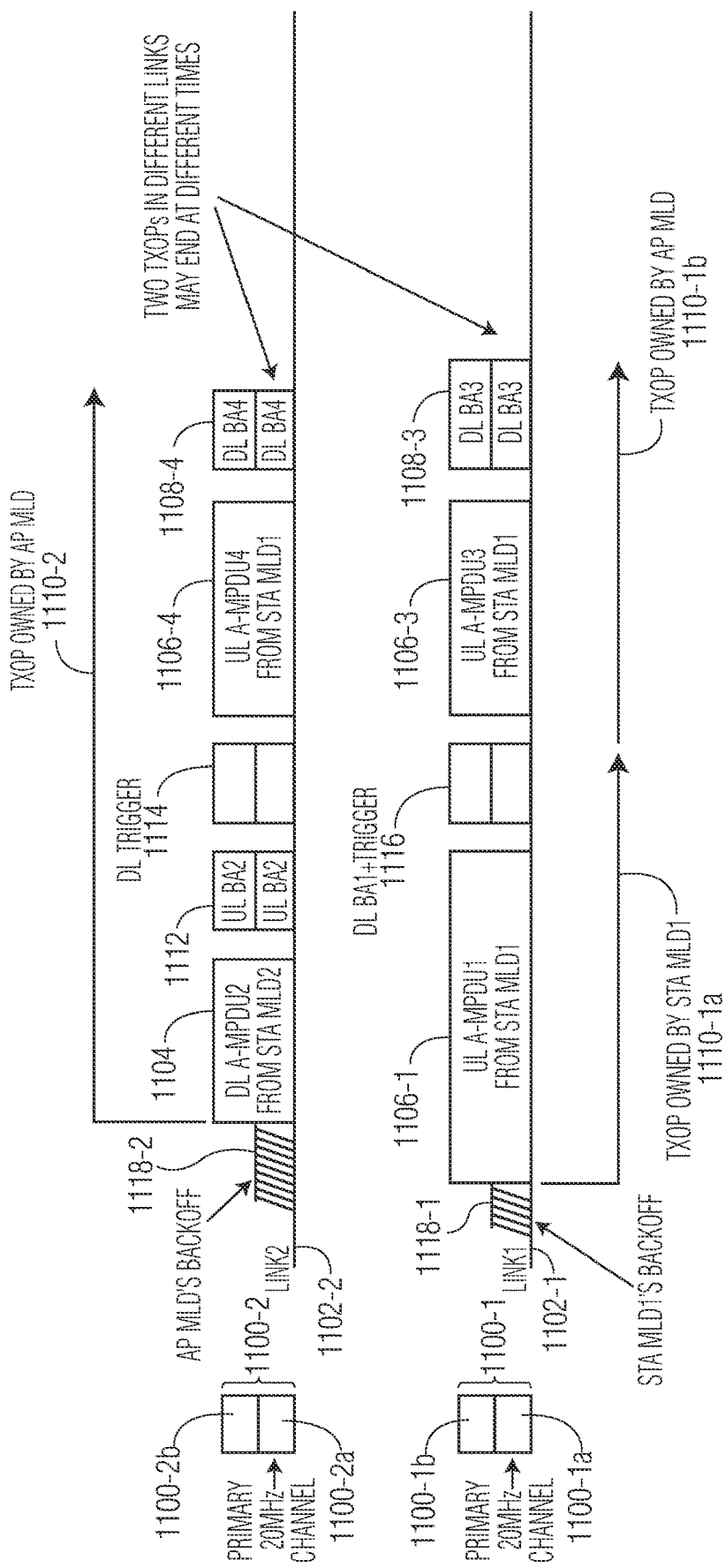
FIG. 11B illustrates another example of a STA MLD performing a soft simultaneous transmission request.

FIG. 11B illustrates another example of a STA MLD performing a soft simultaneous transmission request. With reference to FIG. 11B, a first NSTR STA MLD, STA MLD1 (not shown), and the AP MLD that has simultaneous transmission capability or STR capability (not shown) may use two links, e.g., link1 1102-1 and link2 1102-2, to exchange frames. In particular, FIG. 11A shows link1 1102-1 as using a 40 MHz channel 1100-1 which includes a primary 20 MHz channel 1100-1*a* and a secondary 20 MHz channel 1100-1*b*, and link2 1102-2 as using a 40 MHz channel 1100-2 which includes a primary 20 MHz channel 1100-2*a* and a secondary 20 MHz channel 1100-2*b*.

In some embodiments, after a first backoff 1118-1 by STA MLD1 on link1 1102-1 (shown by "STA MLD1's backoff"), STA MLD1 may transmit a first UL A-MPDU frame, UL A-MPDU1 from STA MLD1 1106-1, on link1 1102-1 to the AP MLD, such that transmission of UL A-MPDU1 from STA MLD1 1106-1 begins a TXOP owned by STA MLD1 1110-1*a* (shown as "TXOP owned by STA MLD1"). In some embodiments, after a second backoff 1118-2 on by the AP MLD on link2 (shown by "AP MLD's backoff"), the AP MLD may transmit a DL A-MPDU frame, DL A-MPDU2 to STA MLD2 1104, to a second STA MLD, STA MLD2, on link2 1102-2. In such an embodiment, transmission of DL A-MPDU2 to STA MLD2 1104 begins a TXOP owned by the AP MLD 1110-2 (shown as "TXOP owned by AP MLD" 1110-2) on link2 1102-2.

In some embodiments, after receiving DL A-MPDU2 to STA MLD2 1104 on link2 1102-2 at STA MLD2, STA MLD2 may transmit an UL BA frame, UL BA2 1112, on link2 1102-2 to the AP MLD, such that the transmission end time of UL BA2 1112 on link2 1102-2 is aligned with the transmission end time of UL A-MPDU1 from STA MLD1 1106-1 on link1 1102-1. In some embodiments, after receiving UL A-MPDU1 from STA MLD1 1106-1 on link1 1102-1 and UL BA2 1112 on link2 1102-2 at the AP MLD, the AP MLD may transmit a first DL Trigger frame, DL Trigger 1114, on link2 1102-2 to STA MLD1 and a DL BA with Trigger frame, DL BA1+Trigger 1116, on link1 1102-1 to STA MLD1. As an example, the transmission of DL Trigger 1114 on link2 1102-2 and DL BA1+Trigger 1116 on link1 1102-1 to STA MLD1 may be an attempt to schedule simultaneous transmission from STA MLD1 and change the TXOP owner on link1 1102-1. In such an embodiment, transmission of DL BA1+Trigger 1116 on link1 1102-1 transfers TXOP owned by STA MLD1 1110-1*a* to a TXOP owned by the AP MLD 1110-1*b* (shown as "TXOP owned by AP MLD") on link1 1102-1.

In some embodiments, after receiving DL Trigger 1114 on link2 1102-2 and DL BA1+Trigger 1116 on link1 1102-1 at STA MLD1, STA MLD1 may transmit a third UL A-MPDU frame, UL A-MPDU3 from STA MLD1 1106-3, on link1 1102-1 to the AP MLD and a fourth UL A-MPDU frame, UL A-MPDU4 from STA MLD1 1106-4, on link2 1102-2 to the AP MLD. In such an embodiment, after receiving UL A-MPDU3 from STA MLD1 1106-3 on link1 1102-1 and UL A-MPDU4 from STA MLD1 1106-4 on link2 1102-2 at the AP MLD, the AP MLD transmits a third DL BA frame, DL BA3 1108-3, on link1 1102-1 to STA MLD1 and a fourth DL BA frame, DL BA4 1108-4, on link2 1102-2 to STA MLD1, such that DL BA3 1108-3 and DL BA4 1108-4 are each received at STA MLD1. In some embodiments, TXOP owned by AP MLD 1110-1*b* on link1 1102-1 and TXOP owned by AP MLD 1110-2 on link2 1102-2 may end at different times.

Figure 12:
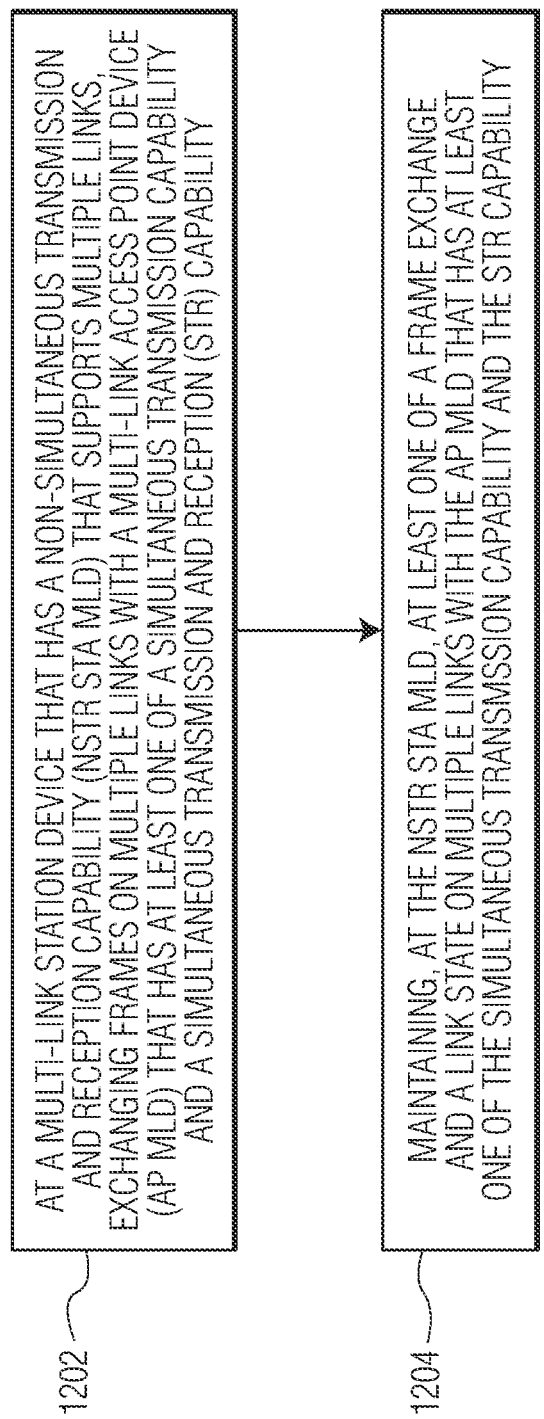
FIG. 12 illustrates a flow diagram of a technique for multi-link operations in accordance with an embodiment of the invention.

FIG. 12 illustrates a flow diagram of a technique for multi-link operations in accordance with an embodiment of the invention. At block 1202, an NSTR STA MLD that supports multiple links exchanges frames on multiple links with a multi-link access point device (AP MLD) that has at least one of a simultaneous transmission capability and a simultaneous transmission and reception (STR) capability. At block 1204, the NSTR STA MLD maintains at least one of a frame exchange and a link state on multiple links with the AP MLD that has at least one of the simultaneous transmission capability and the STR capability.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of multi-link operations, the method comprising:
   at a multi-link station device that has a non-simultaneous transmission and reception capability (NSTR STA MLD) that supports multiple links, exchanging frames on multiple links with a multi-link access point device (AP MLD) that has at least one of a simultaneous transmission capability and a simultaneous transmission and reception (STR) capability;
   maintaining, at the NSTR STA MLD, a link state on multiple links with the AP MLD that has at least one of the simultaneous transmission capability and the STR capability, wherein maintaining the link state at the NSTR STA MLD further includes:
      at the NSTR STA MLD, finishing a transmission on a second link, link2, while a backoff counter of a first link, link1, is not zero;
      deferring link1's backoff until a Physical Layer Protocol Data Unit (PPDU) with Transmission Opportunity (TXOP) duration information is received at the NSTR STA MLD on link2, wherein deferring link1's backoff comprises after a maximal PPDU length passes without detecting a frame on link2, performing link1's backoff based on a Clear Channel Assessment (CCA) level on link1; and
      resuming the link state of link1 at the NSTR STA MLD.

2. The method of claim 1, wherein maintaining further comprises:
   maintaining, at the NSTR STA MLD, a frame exchange at the NSTR STA MLD on the multiple links; and
   avoiding, at the NSTR STA MLD, simultaneous transmit while receive on the multiple links with the AP MLD that has at least one of the simultaneous transmission capability and the STR capability.

3. The method of claim 2, wherein avoiding simultaneous transmit while receive at the NSTR STA MLD further comprises:
   at an interframe space on each link, timing the interframe space to be longer than a Short Interframe Space (SIFS) and shorter than a Point Coordination Function (PCF) Interframe Space (PIFS).

4. The method of claim 2, wherein avoiding simultaneous transmit while receive at the NSTR STA MLD further comprises:
   indicating, by the NSTR STA MLD, parameters for a responding frame in a High Efficiency (HE) Control field of a Physical Layer Protocol Data Unit (PPDU); and
   transmitting the PPDU to the AP MLD that has at least one of the simultaneous transmission capability and the STR capability.

5. The method of claim 4, wherein the parameters for the responding frame includes at least one of a PPDU length, a PPDU type, a Modulation and Coding Scheme (MCS), and bandwidth information.

6. The method of claim 4, wherein the HE Control field is at least one of a new defined field and a triggered response scheduling (TRS) field.

7. The method of claim 4, wherein the PPDU is at least one of a Trigger frame and a frame with a new control subtype.

8. The method of claim 1, wherein maintaining the link state at the NSTR STA MLD further comprises:
   at the NSTR STA MLD, finishing the transmission on link2;
   receiving, at the NSTR STA MLD, from the AP MLD that has at least one of the simultaneous transmission capability and the STR capability, an announcement that indicates activity on link1 during the transmission on link2, wherein the announcement reports the AP MLD's network allocation vector (NAV) timer of link1;
   advancing the backoff counter of link1 in response to the announcement received at the NSTR STA MLD; and
   resuming the link state of link1 at the NSTR STA MLD.

9. The method of claim 1, wherein resuming the link state of link1 at the NSTR STA MLD further comprises synchronization of a medium via performing the backoff based on an energy level and a CCA level before a NAVSyncDelay for transmitting a Request-to-Send (RTS) frame, and wherein the energy level and CCA level are between −82 dbm and −62 dbm.

10. The method of claim 1, wherein maintaining the link state at the NSTR STA MLD further comprises:
   at the NSTR STA MLD, finishing the transmission on link2 while the backoff counter of link1 is not zero;
   deferring link1's backoff until a time of NAVSyncDelay passes without detection of a PPDU on link2; and
   resuming the link state of link1 at the NSTR STA MLD.

11. A multi-link station device that has a non-simultaneous transmission and reception capability (NSTR STA MLD), the NSTR STA MLD comprising:
   a processor configured to:
   support multiple links;
   exchange frames on multiple links with a multi-link access point device (AP MLD) with at least one of a simultaneous transmission capability and a simultaneous transmission and reception (STR) capability on the multiple links;
   maintain a link state on multiple links with the AP MLD that has at least one of the simultaneous transmission capability and the STR capability; wherein maintenance of the link state further includes:
      completion of a transmission on a second link, link2, while a backoff counter of a first link, link1, is not zero;
      deferment of link1's backoff until a Physical Layer Protocol Data Unit (PPDU) with Transmission Opportunity (TXOP) duration information is received at the NSTR STA MLD on link2, wherein deferment of link1's backoff comprises after a maximal PPDU length passes without detecting a frame on link2, performing link1's backoff based on a Clear Channel Assessment (CCA) level on link1; and
      resumption of the link state of link1 at the NSTR STA MLD.

12. The NSTR STA MLD of claim 11, wherein maintenance further comprises:
   maintenance of a frame exchange on the multiple links; and
   avoidance of simultaneous transmit while receive on the multiple links with the AP MLD that has at least one of the simultaneous transmission capability and the STR capability.

13. The NSTR STA MLD of claim 12, wherein avoidance of simultaneous transmit while receive at the NSTR STA MLD further comprises:
   at an interframe space on the multiple links, time of the interframe space being longer than a Short Interframe Space (SIFS) and shorter than a Point Coordination Function (PCF) Interframe Space (PIFS).

14. The NSTR STA MLD of claim 12, wherein avoidance of simultaneous transmit while receive at the NSTR STA MLD further comprises:
   indication of parameters for a responding frame in a High Efficiency (HE) Control field of a Physical Layer Protocol Data Unit (PPDU); and
   transmission of the PPDU to the AP MLD that has at least one of the simultaneous transmission capability and the STR capability.

15. The NSTR STA MLD of claim 14, wherein the parameters for the responding frame includes at least one of a PPDU length, a PPDU type, a Modulation and Coding Scheme (MCS), and bandwidth information.

16. The NSTR STA MLD of claim 14, wherein the HE Control field is at least one of a new defined field and a triggered response scheduling (TRS) field.

17. The NSTR STA MLD of claim 14, wherein the PPDU is at least one of a Trigger frame and a frame with a new control subtype.

18. The NSTR STA MLD of claim 11, wherein maintenance of the link state further comprises:
   completion of the transmission on link2;
   reception of an announcement that indicates activity on link1 during the transmission on link2 from the AP MLD that has at least one of the simultaneous transmission capability and the STR capability;
   advancement of the backoff counter of link1 in response to the announcement from the AP MLD that has at least one of the simultaneous transmission capability and the STR capability, wherein the announcement reports the AP MLD's network allocation vector (NAV) timer of link1; and
   resumption of the link state of link1 at the NSTR STA MLD.

19. The NSTR STA MLD of claim 11, wherein resumption of the link state of link1 at the NSTR STA MLD further comprises synchronization of a medium via performance of the backoff based on an energy level and a CCA level before a NAVSyncDelay for transmission of a Request-to-Send (RTS) frame, and wherein the energy level and CCA level are between −82 dbm and −62 dbm.

20. The NSTR STA MLD of claim 11, wherein maintenance of the link state further comprises:

completion of the transmission on link2 while the backoff counter of link1 is not zero;

deferment of link1's backoff until a time of NAVSyncDelay passes without detection of a PPDU on link2; and resumption of the link state of link1 at the NSTR STA MLD.

* * * * *